United States Patent
Nanjo et al.

(10) Patent No.: US 7,345,823 B2
(45) Date of Patent: Mar. 18, 2008

(54) OPTICAL SYSTEM, COLOR INFORMATION DISPLAYING METHOD, OPTICAL DEFLECTING DEVICE, AND IMAGE PROJECTION DISPLAYING APPARATUS

(75) Inventors: Takeshi Nanjo, Miyagi (JP); Akihiro Yamakage, Iwate (JP); Masaaki Ishiyama, Iwate (JP); Seiichi Katoh, Miyagi (JP); Koichi Ohtaka, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/252,815

(22) Filed: Oct. 19, 2005

(65) Prior Publication Data

US 2006/0104597 A1    May 18, 2006

(30) Foreign Application Priority Data

Oct. 20, 2004    (JP)    ............... 2004-305375

(51) Int. Cl.
    *G02B 27/14*    (2006.01)
(52) U.S. Cl. .................................... 359/634
(58) Field of Classification Search .............. None
    See application file for complete search history.

(56) References Cited

U.S. PATENT DOCUMENTS

| | | | |
|---|---|---|---|
| 5,424,868 A * | 6/1995 | Fielding et al. ............. 359/634 |
| 5,704,701 A * | 1/1998 | Kavanagh et al. ............ 353/33 |
| 5,868,480 A * | 2/1999 | Zeinali ......................... 353/31 |
| 6,134,044 A * | 10/2000 | Gdovin et al. ............... 359/295 |
| 6,219,110 B1 * | 4/2001 | Ishikawa et al. ............. 348/759 |
| 6,717,348 B2 * | 4/2004 | Takahashi .................... 313/483 |
| 6,900,915 B2 | 5/2005 | Nanjyo et al. |
| 6,947,195 B2 | 9/2005 | Ohtaka et al. |
| 2003/0142383 A1 * | 7/2003 | Nanjyo et al. ............... 359/224 |

(Continued)

FOREIGN PATENT DOCUMENTS

JP    6-258596    9/1994

(Continued)

OTHER PUBLICATIONS

U.S. Appl. No. 11/406,372, filed Apr. 19, 2006, Nanjyo et al.

(Continued)

*Primary Examiner*—Sung Pak
*Assistant Examiner*—Chad H. Smith
(74) *Attorney, Agent, or Firm*—Oblon, Spivak, McClelland, Maier & Neustadt, P.C.

(57) ABSTRACT

An optical system is disclosed, including: an optical deflecting array including a plurality of optical deflecting devices arranged in a two-dimensional array, each of optical deflecting devices displacing a member having an optical reflection area and deflecting light, so that an incoming light flux entering the optical reflection area is deflected to a reflection direction being changed, a light source illuminating the optical deflecting array, and a projection lens projecting reflected light from the optical deflecting array based on color information. Each of the optical deflecting devices deflects light to two-axis directions, incoming light fluxes having different colors enter each of the optical deflecting devices from two directions respectively corresponding to two deflection axes, and are reflected by each of the optical deflecting devices based on the color information; and each of reflected light fluxes is led to the projection lens for a respective arbitrary time.

9 Claims, 12 Drawing Sheets

U.S. PATENT DOCUMENTS

| | | | |
|---|---|---|---|
| 2004/0012667 A1 | 1/2004 | Ohtaka et al. | |
| 2004/0114921 A1* | 6/2004 | Braun et al. | 396/661 |
| 2004/0263936 A1 | 12/2004 | Nanjyo et al. | |
| 2004/0263945 A1 | 12/2004 | Nanjyo et al. | |
| 2006/0104597 A1 | 5/2006 | Nanjo et al. | |

FOREIGN PATENT DOCUMENTS

| | | |
|---|---|---|
| JP | 2001-222082 | 8/2001 |
| JP | 2001-242545 | 9/2001 |
| JP | 2002-116501 | 4/2002 |
| JP | 2002-169221 | 6/2002 |
| JP | 2004-78136 | 3/2004 |
| JP | 2004-138881 | 5/2004 |
| JP | 2004-286970 | 10/2004 |
| JP | 2004-317744 | 11/2004 |
| JP | 2005-17799 | 1/2005 |
| JP | 2005-195721 | 7/2005 |
| JP | 2005-195798 | 7/2005 |
| JP | 2005-292684 | 10/2005 |
| JP | 2005-326782 | 11/2005 |

OTHER PUBLICATIONS

U.S. Appl. No. 11/582,995, filed Oct. 19, 2006, Katoh et al.
U.S. Appl. No. 11/681,021, filed Mar. 1, 2007, Katoh et al.
U.S. Appl. No. 11/776,305, filed Jul. 11, 2007, Nanjyo et al.

* cited by examiner

B-B' CROSS SECTION

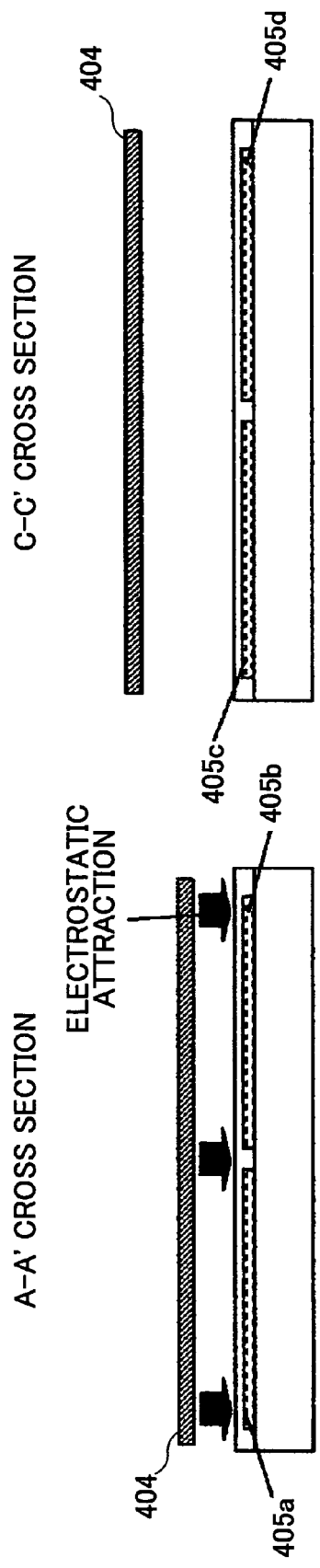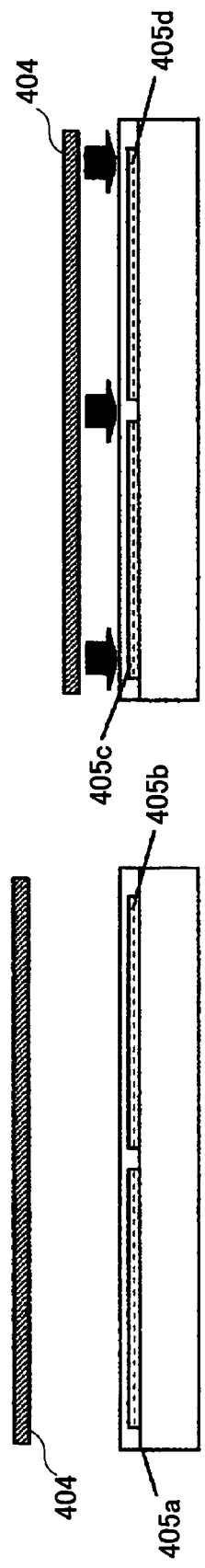
FIG.5A / FIG.5B

RELATED ART1

ONE THIRD ONE-FRAME TIME(16.6msec.)=5.56msec.

COLOR SWITCH BY COLOR WHEEL:APPROXIMATELY 0.93msec.

SIXTH EMBODIMENT

ONE-FRAME TIME=16.6msec

COLOR SWITCH ACCORDING TO PRESENT INVENTION:APPROXIMATELY DOZZNS OF MICRO SECONDS

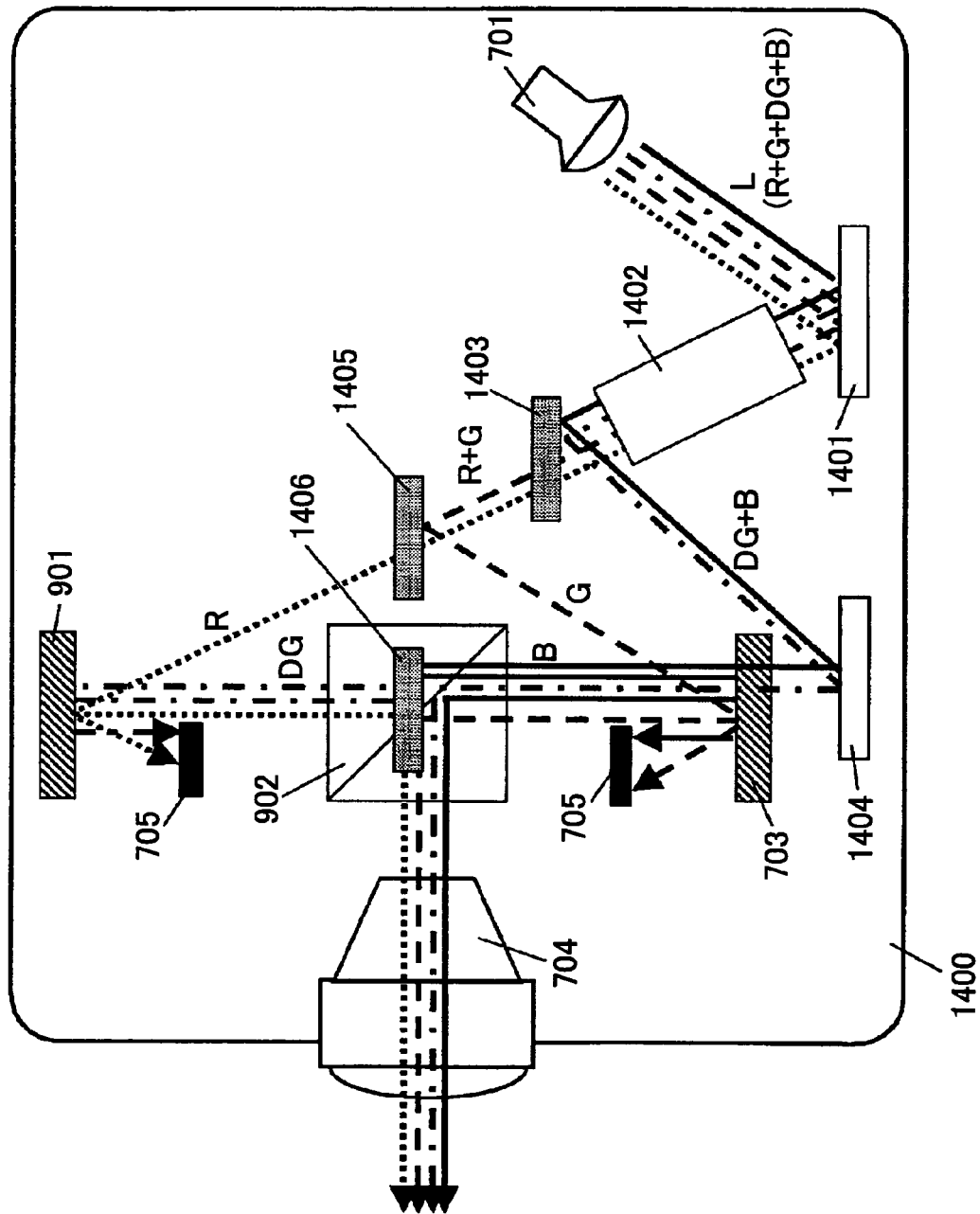

OPTICAL SYSTEM, COLOR INFORMATION DISPLAYING METHOD, OPTICAL DEFLECTING DEVICE, AND IMAGE PROJECTION DISPLAYING APPARATUS

BACKGROUND OF THE INVENTION

1. Field of the Invention

The present invention generally relates to an optical system, a color information displaying method, and an image projection displaying apparatus using an optical deflecting array in which a plurality of optical deflecting devices is arrayed in two dimensions, each capable of changing a direction of outgoing light with respect to incoming light, and an optical deflecting device capable of changing the direction of outgoing light with respect to incoming light, and more particularly to a technology preferable to an image apparatus such as a projector, or a rear projection television.

2. Description of the Related Art

Japanese Laid-open Patent Application No. 2004-78136 discloses an optical deflecting device for deflecting incoming light to multiple predetermined directions, an optical deflecting array including a plurality of the optical deflecting devices in an one dimension or two dimensions, and an image projection displaying apparatus using the optical deflecting array.

As the above-described optical deflecting device, there is an optical deflecting device capable of optically deflecting the incoming light to two directions with respect to one axis set as a center, an optical deflecting device capable of optically deflecting the incoming light to multiple directions with respect to two or more axes set as centers, and a like.

The above-described optical deflecting array is used as an optical system of an image projection displaying apparatus. If the image projection displaying apparatus conducts a single color display, the optical deflecting array can be configured by the optical deflecting array using optical deflecting devices having a single axis. However, in order to display a color image, it is required to combine three primary colors. Accordingly, in the optical system disclosed in the Japanese Laid-open Patent Application No. 2004-78136, a color wheel configured by color filters of the three primary colors is placed on a light path between a color light source and the optical deflecting device, and is rotated, so that the color display is conducted by rapidly switching a color of the incoming light.

FIG. 1 is a diagram showing a color image projection displaying apparatus 100 (Related Art 1). In FIG. 1, the color image projection displaying apparatus 100 includes a white color light source 101, a color wheel 102 being a rotating disc shape, a rod lens 103, an optical deflecting array 104 deflecting to two directions with respect to a single axis, a projection lens 105, and a light absorption plate 106. The color image projection displaying apparatus 100 projects an image onto a screen 107.

It is assumed that a light flux output from the white color light source 101 passes through any one of filters, for example, a red filter within the color wheel 102 switching filters in a time sequence. The light flux becomes a red color light (R) and passes through the rod lens 103. The rod lens 103 makes the light flux be a parallel light, and the light flux enters individual optical deflecting devices of the optical deflecting array 104. In this case, color information corresponding to a red image is input to the individual optical deflecting devices of the optical deflecting array 104. In a case of a presence of the color information, an incident red color light (R) is lead to the projection lens 105. On the other hand, in a case of an absence of the color information, the incident red color light (R) is lead to the light absorption plate 106. This switch of the deflecting direction is conducted by displacing a member as a mirror. In the following, one operation leading the light flux to the projection lens 105 in the case of the presence of the color information is called an ON operation, and another operation leading the light flux to the light absorption plate 106 in the case of the absence of the color information is called an OFF operation.

At the ON operation, an image shown on the optical deflecting array 104 is output to the projection lens 105, and is formed on the screen 107. At the OFF operation, the image is output to a direction to which the image is not output to the projection lens 105, and is absorbed by the light absorption plate 106, so that the image does not reach the screen 107. In a case in that the three primary colors are projected onto the screen 107 in the time sequence at high speed, human eyes do not recognize an individual image in which a color is decomposed into the three primary colors because of a residual image, and see an image combining three primary colors as a color image.

Japanese Laid-open Patent Application No. 2004-138881 discloses an optical system for displaying a color image by a single optical deflecting device alone. An image projection displaying apparatus (Related Art 2) using the above-described optical system distributes a single incoming light flux to four directions: three directions respective to the three primary colors, and one direction for the OFF (black) information, by using an optical deflecting device using a two-axis deflection. After that, the image projection displaying apparatus forms an image onto a screen by combining reflected light in three directions respective to the three primary colors.

FIG. 2A is a side view of an optical system in the Related Art 2. FIG. 2B is a perspective view showing a state of light fluxes output from a light source. In FIG. 2A and FIG. 2B, an optical deflecting array 10, a first field lens 11, projection lenses 12R, 12G, and 12B, a second field lens 13, an image displaying part (screen) 14, a light source 15, a light flux shaping lens 16, a plane reflection mirror 17, a light flux L, and an optical axis O for the entire optical system are shown. In addition, R, G, B, and off are affixed to reference signs, and denote color information of each of the primary colors (red, green, blue) and the OFF information. In FIG. 2A, in order to avoid an intricate drawing, an light source system for inputting a parallel light flux into the optical deflecting array is omitted. In addition, in FIG. 2B, light fluxes are shown until a surface 11a of the first field lens 11, and the light fluxes after passing the surface 11a are omitted.

The incoming light flux is output from the light source 15 shown in FIG. 2B, becomes the parallel light flux L by the light flux shaping lens 16 which is generally called a condensing lens, changes a direction at the plane reflection mirror 17, and then enters the optical deflecting array 10 along the optical axis O perpendicularly set to a surface of the optical deflecting array 10. It should be noted that a light flux is shaped by a light shielding mask 16a so that a shape of a cross section of the light flux L is approximately the same as and slightly larger than a shape of an available portion of the optical deflecting array 10.

The light flux L entering to the optical deflecting array 10 is deflected in response to the color information, and reflected light becomes a light flux LR for a given time. When the light flux LR enters the surface 11a of the first field lens 11, the light flux LR is refracted and output from the optical deflecting array 10 so that a center light of the light flux LR is parallel to the optical axis O. Moreover, the light flux LR is set to be adjacent to the first field lens 11. An optical axis of the light flux LR is affected by an image-forming action while passing the projection lens 12R parallel to a normal line with respect to the surface of the optical deflecting array 10, and the light flux LR enters the second field lens 13 having approximately the same size as the first field lens 11. By the second field lens 13, the light flux LR is refracted so that center light of the light flux LR directs toward a display center 14A of the image displaying part 14. Accordingly, the light flux LR forms an image at the image displaying part 14. It should be noted that even if the light flux LR includes color information, the image cannot be a color image as long as light emitted from a white color source is used. Thus, in the Related Art 2, a color filter FR is arranged at an incoming side of the surface 11a of the first field lens 11.

For a next given time, the optical deflecting array 10 is deflected based on next color information. For example, the light flux L refracts at the optical deflecting array 10, and becomes a light flux LG. A center light of the light flux LG seems to be identical to the optical axis O in FIG. 2A. However, as seen from the perspective view shown in FIG. 2B, the center light of the light flux LG distances from the optical axis O similar to the light flux LG in a plan view. Accordingly, an action which the light flux LG is affected from the optical system is also the same as the light flux LR, except for a difference between a side view and a plan view. Thus, a center of the light flux LG positions to the display center 14a of the image displaying part 14, and the light flux LG forms an image.

Moreover, in a further time, a light flux LB is generated. In the same manner described above, a center of the light flux LB positions to the display center 14a of the image displaying part 14. In the above explanation, the light fluxes LR, LG, and LB include respective color information. In this case, as the color information, binary information showing a presence or an absence of a color is input. Accordingly, each of the light fluxes LR, LG, and LB includes a light beam acquired by a deflected direction when a color is present. In a case of information indicating that the color is not present, that is, in a case of the OFF information, a deflected direction by the optical deflecting device is shown as a direction of a light flux Loff in FIG. 2B. However, the deflected direction of the OFF information is identical to the three primary colors. Since the light flux Loff is an unnecessary light flux for the image display, the light flux Loff is shielded at a location ineffective to other available light fluxes, for example, on the incoming side of the surface 11a of the first field lens by a shielding member which is not shown.

However, as long as there is no image accumulation action at the image displaying part 14, an image by the light flux LR vanishes when an image of the light flux LR is displayed. In the same manner, when an image by the light flux LB is displayed, the image of the light flux LG vanishes. That is, since images corresponding to the three primary colors are displayed in a time sequence, there is no full-color image at any moment. However, these images can be seen by human eyes to be the full-color image of the residual image if a switch period is sufficiently shorter.

The Japanese Laid-open Patent Application No. 2004-138881 discloses an image projection displaying apparatus using another optical system and displaying a color image by a single optical deflecting device alone (Related Art 3).

In the Related Art 3, by using an optical deflecting device having a two-axis deflection, in contrary to FIG. 2A and FIG. 2B, incoming light fluxes of R, G, and B in respective three directions are directed to one direction leading to a projection lens and three directions for the OFF (black) information, reflected light in a single direction leading to the projection lens forms an image on a screen.

FIG. 3A is a perspective view showing a part of light source system for explaining the Related Art 3, and FIG. 3B is a side view of the light source system. In FIG. 3A and FIG. 3B, reference signs r, g, and b are affixed to other reference sign, similar to the reference sings R, G, and B, to individually indicate a color. In the Related Art 3, three separate light sources corresponding to three primary colors are used. In FIG. 3, for the sake of convenience, only one light source 15G of three light sources is shown.

At approximately the same position where the light flux LG in FIG. 2B enters to the first field lens 11a, a condenser lens 16G is placed in FIG. 3B. The light source 15G is arranged so that the light flux LG goes backward by the condenser lens 16G and a divergent light flux forms a luminous flux LG'. The luminous flux LG' is a single color light of green of the three primary colors. A light source itself may emit a green color, or a color filter of green may be arranged to a white color light source.

In this configuration, in a case in that an optical deflecting device of an optical deflecting array is deflected to the same direction as the direction forming the light flux LG in FIG. 2B, in FIG. 3A, the luminous flux LG' is deflected to be a light flux L' perpendicular to a surface of an optical deflecting array 10. At the side view shown in FIG. 3B, since the luminous flux LG' and the light flux L' are overlapped with each other, the light source 15G is not shown. However, a light source 15R, the luminous flux LR', and the light flux L' are in the same relationship. The light flux L' enters an opening 12a of a projection lens 12, an outgoing light of the light flux L' is focused on a surface of an image displaying part 14 so that a light beam passing a center of the light flux becomes identical to a display center 14a of the image displaying part 14. Then, image including the color information of green indicated by the optical deflecting array 10 is displayed at the image displaying part 14. By the same configurations regarding other single colors of the primary colors, that is, red and blue, luminous fluxes LR' and LB' are deflected to be identical to the light flux L' as a light flux including respective color information corresponding to the optical deflecting array 10. Accordingly, there is no difference at the image displaying part 14, and three color images are identically overlapped with each other. If all deflected direction of the optical deflecting array 10 are directed to a direction corresponding the color information of red, the luminous flux LR' is deflected to a direction of the light flux L'. However, the luminous fluxes LG' and LB' are deflected to completely different directions.

The luminous flux LG' will be described. A deflection surface of the optical deflecting device is plane mirror. A normal line N of the plane mirror of each optical deflecting device is directed toward in a direction dividing an inner angel between the incoming light flux and the outgoing light flux into two equal angels. The plane mirror reflects a light beam to a direction symmetric to the normal line N. However, in the above-described condition, the luminous flux LG' becomes a reflected light flux symmetric to a normal line Nr, which will be described later, as indicated by a luminous flux LG'r shown in FIG. 3A. In FIG. 3A, it appears that the luminous flux LG'r overlaps with the light flux L' since both fluxes LG'r and L' are drawn in a plane. However, the luminous flux LG'r and the light flux L' are emitted in different directions from the optical deflecting array 10.

Since the optical deflecting array is an aggregate of the optical defecting devices, normal lines cannot be individually drawn clearly, only the normal line Nr is shown at a center of the optical deflecting array 10, representatively. In the following, only the normal line Nr is shown in the same manner. If the deflected direction of the optical deflecting array 10 is always directed to a direction corresponding the color information of blue, for the same reason, the luminous flux LG' becomes a reflected light flux symmetric to the normal line Nb as indicated by the luminous flux LG'b in FIG. 3A. A light flux, which is unwanted for an image display, does not enter the projection lens and becomes a stray light. Accordingly, the light flux can be absorbed by using a light absorption plate, or a like. In a case of using the color information of each color, the optical deflecting device which the OFF information enters inclines a deflection surface toward in the same direction as a direction on which the light flux Loff is formed in FIG. 2B. In this case, a normal line of the plane mirror of the optical deflecting device is directed to a direction of the normal line Noff. Since the luminous flux LG' becomes a light flux LG' off by the optical deflecting device of the luminous flux LG', and does not enter the projection lens, image pixels corresponding to the optical deflecting device of the luminous flux LG' form a black display. In the above, the luminous flux LG' is described. Other luminous fluxes are not shown other than the luminous flux LR'b in FIG. 3B but the same manner is conducted for each color. As shown in FIG. 3A, the luminous fluxes LG'b and LR'off overlap with each other at substantially the same light flux location. Thus, since each single color light source does not interfere with other colors, each color light source can successively emit light even if the color information of other colors are being displayed.

Next, an example case of an optical deflecting device capable of conducting two-axis light deflection as described in the above Japanese Laid-open Patent Application No. 2004-78136 and No. 2004-138881 will be described. FIG. 4A and FIG. 4B are diagrams showing a configuration of the optical deflecting devices.

FIG. 4A is a top view of the optical deflecting device. In FIG. 4A, a fulcrum member 403 and electrodes 405a through 405d are transparently shown. FIG. 4B is a cross-sectional view taken on line B-B' of FIG. 4A. The optical deflecting device shown in FIG. 4A and FIG. 4B is shown as one optical deflecting device in a group of optical deflecting devices arranged in two dimensions as an optical deflecting array.

The optical deflecting device in FIG. 4A and FIG. 4B is one optical deflecting device in that a member including a light reflection area is displaced by an electrostatic attraction so that a light flux entering the light reflection area is deflected to a reflection direction being changed. The optical deflecting device includes a substrate 401, a plurality of controlled members 402, a fulcrum member 403, a plate member 404, and a plurality of electrodes 405a through 405d. Each of the plurality of controlled members 402 includes a stopper at an upper potion. The plurality of controlled members 402 are arranged at a plurality of edges of the substrate 401, respectively. The fulcrum member 403 includes a nib, and is arranged on an upper surface of the substrate 401. The plate member 404 does not includes a fixed end, includes the light reflection area on an upper surface, and includes a electric conductor layer formed by a member being electrically conductive partially at least. The plate member 404 is movably arranged in a space forming by the substrate 401, the fulcrum member 403, the stoppers of the plurality of controlled members 402. The plurality of electrodes 405a through 405d are respectively arranged on the substrate 401, and approximately face to the electric conductor layer of the plate member 404.

The above-described optical deflecting devices include the following advantages:

- a tilt angle is determined by contacts of the fulcrum member 403, the substrate 401, and the plate member 404. Accordingly, a deflection angle of a mirror is easily and stably controlled.
- the plate member having a thin film is reversed rapidly by applying a different electric potential to a facing electrode as a center of the fulcrum member 403. Accordingly, a response speed can be improved.
- Since the plate member 404 does not have a fixed end, the plate member 404 is not deteriorated in along term without a deformation caused by a twist or a like, and is driven with a lower voltage.
- Since a fine and light plane member can be formed by a semiconductor process, a shock from a collision to the stopper can be lower. Accordingly, the plane member 404 is not be deteriorated in a long term.
- Each configuration of the controlled members 402, the plate member 404, and the light reflection area is arbitrarily determined. Therefore, an on/off ratio (S/N (Signal to Noise) ratio in an imaging device, or a contrast ratio in a picture reproducer) can be improved.
- The semiconductor process and an apparatus thereof can be used. Accordingly, it is possible to be further miniaturization and integration at lower expense.
- The plurality of electrodes 405a through 405d are arranged with a central focus on the fulcrum member 403. Accordingly, a deflection direction of one-axis two dimensions and a deflection direction of two-axis three dimension can be realized.

Next, an example of a driving method of the above-described optical deflecting device will be described with reference to FIG. 5A and FIG. 5B, and FIG. 6. This driving method is a driving method (light deflection method) in a case in that a plate member 404 is electrically floating.

A state in which the plate member 404 shown in FIG. 4A and FIG. 4B will be described with reference to FIG. 5A and FIG. 5B. FIG. 5A shows cross-sectional views taken along a line A-A' and a line C-C' of FIG. 4A in an OFF operation, and FIG. 5B shows cross-sectional views taken along the line A-A' and the line C-C' of FIG. 4A in an ON operation.

In FIG. 5A and FIG. 5B, electric potentials for applying to the electrodes 404a through 404d are switched, and then an optical deflection operation is conducted. In addition, FIG. 5A and FIG. 5B show electrostatic attraction (black arrows) which occurs by the electric potentials applied to the electrodes 405a through 405d. FIG. 6 shows a timing chart of the electric potentials applied to the electrodes 405a through 405d.

In the following, referring to FIG. 5A and FIG. 5B, and FIG. 6, a driving method of the optical deflecting device, and a inclination displacement operation (that is, optical deflection operation) of the plate member 404 will be described. First, in the OFF operation of FIG. 6, a higher electric potential a is applied to the electrode 405a, a lower electric potential c is applied to the electrode 405b, and a medial electric potential b is applied to the electrode 405c and the electrode 405d. Accordingly, the plate member 404, which includes the electric conductor layer, and is electrically floating and facing to the electrodes 405a through 405d, has the same electric potential as the medial electric potential b, which is analogized easily from a calculation of a simple closed circuit.

Thus, the electrostatic attraction does not occur with respect to the electrodes 405c and 405d at an ON side. On the other hand, as shown in FIG. 5A, the electrostatic attraction occurs with respect to the electrodes 405a and 405b at an OFF side, and the plate member 404 is inclined and displaced to the OFF side. This operation is not only for the OFF operation in a series of the optical deflection operation, but also for a reset operation conducted when the optical deflection operation is initialized.

In the ON operation in FIG. 6, the higher electric potential a is applied to the electrode 405c, the lower electric potential c is applied to the electrode 405d, and the medial electric potential b is applied to the electrode 405b. Accordingly, the plate member 404, which includes the electric conductor layer, and is electrically floating and facing to the electrodes 405a through 405d, has the same electric potential as the medial electric potential b, which is analogized easily from a calculation of a simple closed circuit. Thus, the electrostatic attraction does not occur with respect to the electrodes 405a and 405b at the OFF side. On the other hand, as shown in FIG. 5B, the electrostatic attraction occurs with respect to the electrodes 405c and 405d at the ON side, and the plate member 404 is inclined and displaced to the ON side.

In FIG. 4A and FIG. 4B, the plate member 404 of the optical deflecting device is shown as a single layer. However, the plate member 404 is not limited to be a single layer but may have two layers as described in the Japanese Laid-open Patent Application No. 2004-78136 and No. 2004-138881.

In addition, in FIG. 5A and FIG. 5B, and FIG. 6, the optical deflection operation of the one-axis two dimensions, in which a side of the electrodes 405a and 405b is the OFF side and a side of the electrode 405c and 405d is the ON side, is described. Since the fulcrum member 403 is arranged with a conical shape at a center of the optical deflecting device, the plate member 404 can be inclined to a side of the electrodes 405a and 405c and a side of the electrodes 405b and 405d, by arbitrarily changing a voltage to apply to the electrodes 405a through 405d. That is, the light deflection of the two-axis three dimension can be realized.

In addition, in FIG. 4A, FIG. 4B, FIG. 5A, FIG. 5B, and FIG. 6, the optical deflecting device has a configuration of displacing the plate member 404 electrically floating and applies the driving method. Alternatively, the optical deflecting device may be an optical deflecting device having a configuration and a driving method in that the plate member 404 is contacted and conductive to the fulcrum member 403, and an electric potential is given to the plate member. That is, the optical deflecting device can be a device capable of conducting a light deflection of two-axis three dimensions.

When a light is illuminated from an arbitrary direction to the plate member 404 having the light reflection area in the optical deflecting device described above, a reflection direction of light is deflected to one of four directions in response to an inclination direction of the plate member. Moreover, when light is entered from a direction perpendicular to a substrate surface (an array surface), reflected light is reflected to four directions being symmetric to each other in a case in that the incoming light is defined as a center. In the optical deflecting array, the optical deflecting devices are closely arranged lengthwise and crosswise, the number of the optical deflecting devices being arranged lengthwise and crosswise is determined based on the number of pixels lengthwise and crosswise necessary to the image display.

The image projection displaying apparatus as described as the Related Art 1 includes one optical deflecting array of the one-axis deflection, one white color light source, and one color wheel. In addition, in the image projection displaying apparatus, by configuring an optical lens, an optical system is included. In the Related Art 1, light from the white light source is successively switched to the three primary colors of R, G, and B using the color wheel to lead to the optical deflecting array. Thus, a time for displaying the color information of each color is divided into three. Accordingly, a light use effect is lowered in one frame time.

Moreover, since the color wheel is rotated at high speed, a noise occurs. In addition, it is required to operate each of the optical deflecting devices forming the optical deflecting array by synchronizing the color wheel being rotated at high speed. As a result, a process of image data becomes complicated.

Furthermore, a mixed color problem may occur at a boundary of color filters forming the color wheel. Thus, it is required to stop an operation of the optical deflecting device, and one frame time cannot be fully used for the image display. In addition, an expense using the color wheel is increased.

In the Related Art 1, in addition to the above-described problems, in general, there is a problem which is called a color flicker or a color breaking. Color flicker is a phenomenon in that light like a rainbow can be seen in a moment when human eyes see an image projected on a screen, and makes human eyes tired. This is a typical problem of the optical system using the color wheel to successively project colors individually.

That is, the primary colors of R, G, and B are successively displayed on the screen and are combined by the residual image. However, a color combination is different among individuals. In addition, when the human eyes move from an end to another end of the screen or when the human eyes blink, the human eyes cannot combine the primary colors well. As a result, color flicker occurs. Color flicker is a main problem in the optical system switching colors by using the color wheel.

In order to solve the problem of color flicker, it is considered that a color switch of the color wheel is conducted at higher speed. For example, in a case in that an image is displayed at 60 Hz of a frame rate, one frame time is 16.7 msec. When this frame time is divided into the three primary colors of R, G, and B, a display time for each color becomes 5.56 msec. In this case, the color wheel may be formed by six divisions of R, G, B, R, G, and B, and a rotation speed of the color wheel may be set to be three times faster. Accordingly, an every display time for each of colors may be reduced to be 0.93 msec. (in practice, an accumulated time can be recognized to be 5.56 msec for six repeats within one frame time). However, even if color flicker is slightly reduced by switching colors at higher speed, it is not sufficient to eliminate color flicker.

The image projection displaying apparatus as described as the Related Art 2 includes one optical deflecting array of the two-axis deflection, one white color source, and three color filters (R, G, and B). In addition, in the image projection displaying apparatus, by configuring an optical lens, an optical system is included. In the Related Art 2, white color light is entered from one direction to the optical deflection array of the two-axis deflection and reflected to four directions of R, G, B, and OFF (black). An outgoing light in a direction of each of the colors R, G, and B becomes respective color light by passing a respective color filter. Three colors are combined by a combination of a field lens, a projection lens, and then a field lens, and displayed on the screen.

However, in the Related Art 2, each of colors R, G, and B radiating in three directions is received by the field lens. Accordingly, a scale of a combination of the field lens, the projection lens, and the field lens becomes larger, and a length of a light path for combining the colors R, G, and B illuminated from the optical deflecting array becomes longer. As a result, the optical system becomes larger.

The image projection displaying apparatus of the Related Art 3 includes one optical deflecting array, a total three light sources corresponding to the colors R, G, and B. In addition, in the image projection displaying apparatus, by configuring an optical lens, an optical system is configured. In the Related Art 3, the three colors R, G, and B enter from relative three directions to the optical deflecting array of the two-deflection, and are reflected to four directions: an ON (for all R, G, and B) direction, an OFF (R) direction, an OFF (G) direction, and an OFF (B) direction. Light from the ON (for all R, G, and B) direction is lead to the projection lens, and is displayed on the screen. Since the light from the ON (for all R, G, and B) direction passes a light path shared with all colors R, G, and B, the three colors R, G, and B are naturally combined. However, in the Related Art 3, since three light sources are required, the image projection displaying apparatus costs more.

SUMMARY OF THE INVENTION

It is a general object of the present invention to provide an optical system, a color information displaying method, an optical deflecting device, and an image projection displaying apparatus, in which the above-mentioned problems are eliminated.

A more specific object of the present invention is to provide the optical system, the color information displaying method, the optical deflecting device, and the image projection displaying apparatus, in which the optical system includes an optical deflecting array arraying a plurality of the optical deflecting devices in a two-dimensional array for deflecting a light flux entering a light reflection area by displacing a member including the light reflection area in order to change a reflection direction, a light source illuminating the optical deflecting array, and a projection lens for projecting reflected light coming from the optical deflecting array based on color information, whereby a color flicker, which is frequently seen in a case of using a color wheel, can be considerably suppressed.

The above objects of the present invention are achieved by an optical system, including: an optical deflecting array including a plurality of optical deflecting devices arranged in a two-dimensional array, each of optical deflecting devices displacing a member having an optical reflection area and deflecting light, so that an incoming light flux entering the optical reflection area is deflected to a reflection direction being changed; a light source illuminating the optical deflecting array; and a projection lens projecting reflected light from the optical deflecting array based on color information, wherein: the plurality of the optical deflecting devices is formed as an optical deflecting device group, and each of the optical deflecting devices deflects light to two-axis directions; incoming light fluxes having different colors enter each of the optical deflecting devices from two direction respectively corresponding to two deflection axes, and are reflected by each of the optical deflecting devices based on the color information; and each of reflected light fluxes is led to the projection lens for respective arbitrary time.

BRIEF DESCRIPTION OF THE DRAWINGS

In the following, embodiments of the present invention will be described with reference to the accompanying drawings.

FIG. 5A shows cross-sectional views taken along a line A-A' and a line C-C' of FIG. 4A in an OFF operation, and FIG. 5B shows cross-sectional views taken along the line A-A' and the line C-C' of FIG. 4A in an ON operation;

FIG. 14 is a diagram showing an image projection displaying apparatus according to an eighth embodiment of the present invention.

DESCRIPTION OF THE PREFERRED EMBODIMENTS

In the following, embodiments of the present invention will be described with reference to the accompanying drawings.

First Embodiment

Figure 7:
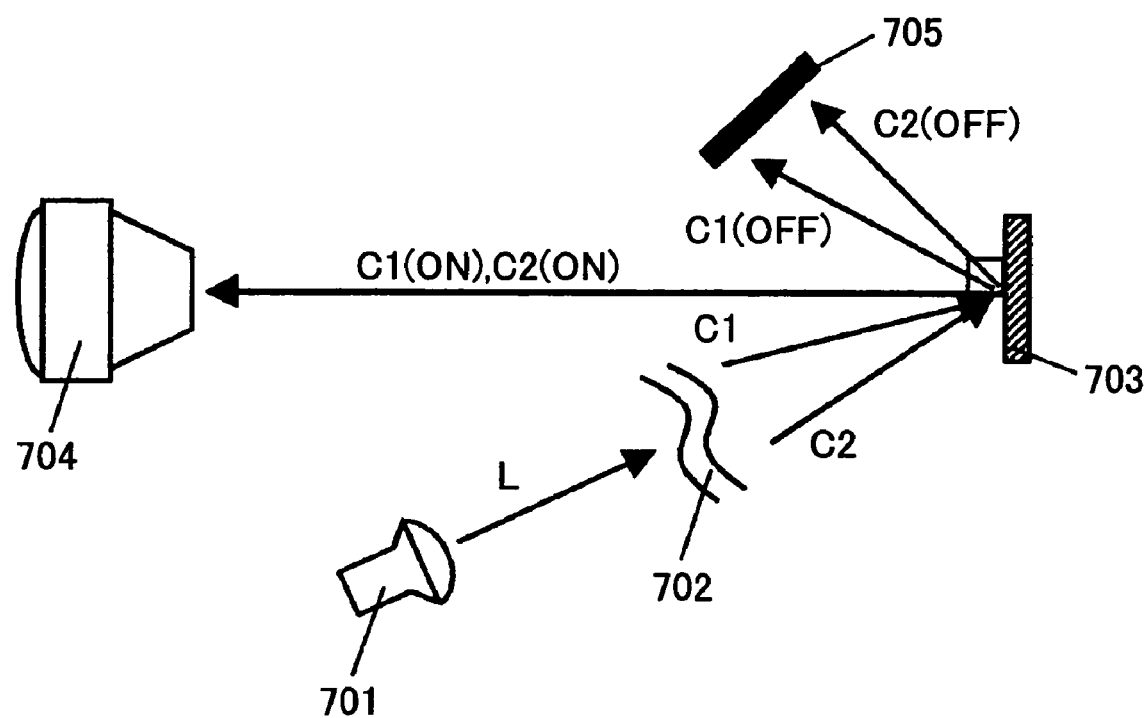
FIG. 7 is a diagram showing an optical system according to a first embodiment of the present invention.

FIG. 7 is a diagram showing an optical system according to a first embodiment of the present invention. In FIG. 7, the optical system includes a light source 701 for emitting a light flux L, an optical lens-mirror combination 702, an optical deflecting array 703 formed by an optical deflecting device group for optically deflecting to two-axis directions, a projection lens 704, and a light absorption plate 705.

Figure 8A:
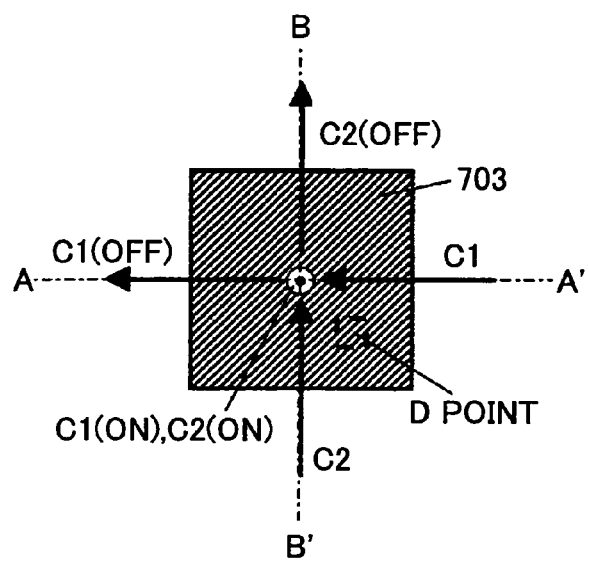
FIG. 8A is a top view of the optical deflecting array in the optical system from a top in a normal line direction of a surface of the optical deflecting array in FIG. 7.

FIG. 8A is a top view of the optical deflecting array 703 in the optical system from a top in a normal line direction of a surface of the optical deflecting array 703 in FIG. 7, FIG.

Figure 8C:
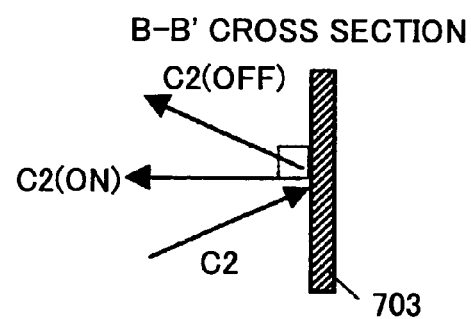
FIG. 8C is a cross-sectional view taken along a line B-B' of the optical deflecting array.
Figure 8B:
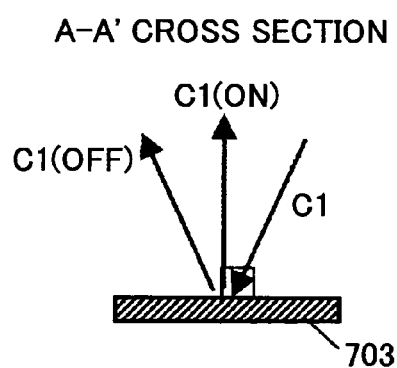
FIG. 8B is a cross-sectional view taken along the line A-A' of the optical deflecting array in FIG. 8A.
Figure 8D:
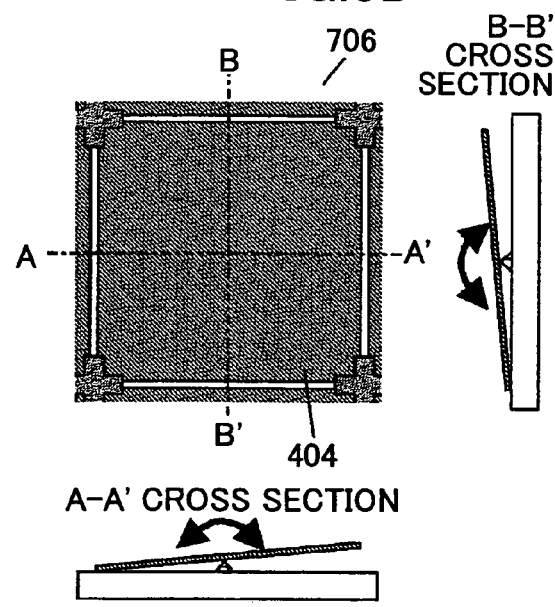
FIG. 8D is a schematic diagram showing a layout of the optical deflecting device arranged at an arbitrary D point on the optical deflecting array.

8B is a cross-sectional view taken along the line A-A' of the optical deflecting array 703 in FIG. 8A, FIG. 8C is a cross-sectional view taken along the line B-B' of the optical deflecting array 703, and FIG. 8D is a schematic diagram showing a layout of the optical deflecting device 706 arranged at an arbitrary D point on the optical deflecting array 703.

In FIG. 7A and FIG. 7B, C1 denotes an incoming light flux of an arbitrary color, C1(ON) denotes a reflected light flux (hereinafter, called an ON light) led to the projection lens 704 when an ON operation for this color is activated, and C1(OFF) denotes a reflected light flux (hereinafter, called an OFF light) being departed from the projection lens 704 and let to the light absorption plate 705 when an OFF operation for this color is activated. C2 denotes an incoming light flux of an arbitrary color other than the incoming light flux C1, C2(ON) denotes the ON light of this color, and C2(OFF) denotes the OFF light of this color.

For example, each of the incoming light flux C1 and the incoming light flux C2 is one of the primary colors (R (Red), G (Green), and B (Blue)), and the incoming light flux C1 and the incoming light flux C2 have different frequencies from each other. The incoming light flux C1 and the incoming light flux C2 are shown by black arrows in FIGS. 8A through 8C. In practice, each of the incoming light flux C1 and the incoming light flux C2 is a light beam having a width for illuminating the entire surface of the optical deflecting array 703. For example, the light source 701 is a white color light source 701 such as a xenon lamp, a halogen lamp, a mercury lamp, or a like. The optical lens-mirror combination 702 is schematically shown by waved lines (to avoid an intricate drawing. For example, the optical lens-mirror combination 702 may include an IR cut mirror or an IR cut filter for cutting infrared light, an integrator lens or a rod lens for changing light from the light source 701 to parallel light, a dichroic mirror or a dichroic prism for separating a target color from the white color source, and a total reflection mirror or a TIR prism for changing an illumination direction for each color to illuminate the optical deflecting array 703. The optical lens-mirror combination 702 mainly separates the light L from the light source 701 into the incoming light fluxes C1 and C2 of arbitrary colors, and changes directions of the incoming light fluxes C1 and C2 to illuminate the optical deflecting array 703. Thus, the above-described combination can easily achieve these functions.

Figure 1:
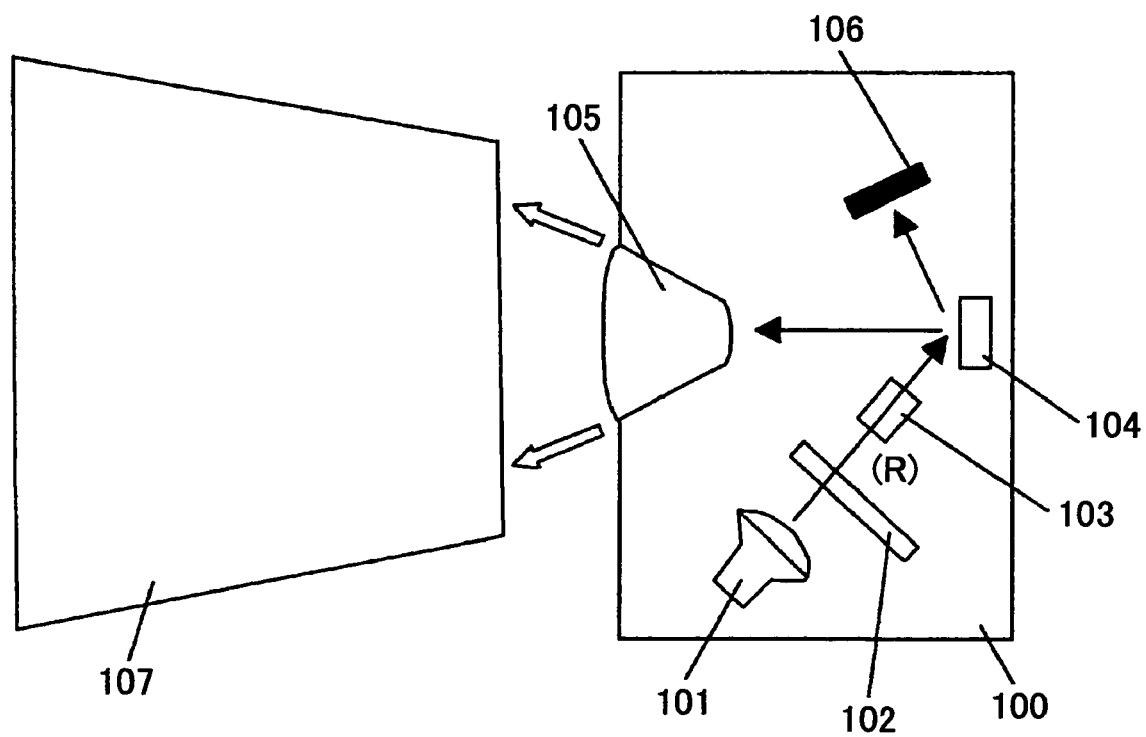
FIG. 1 is a diagram showing a color image projection displaying apparatus (Related Art 1)
Figure 2A:
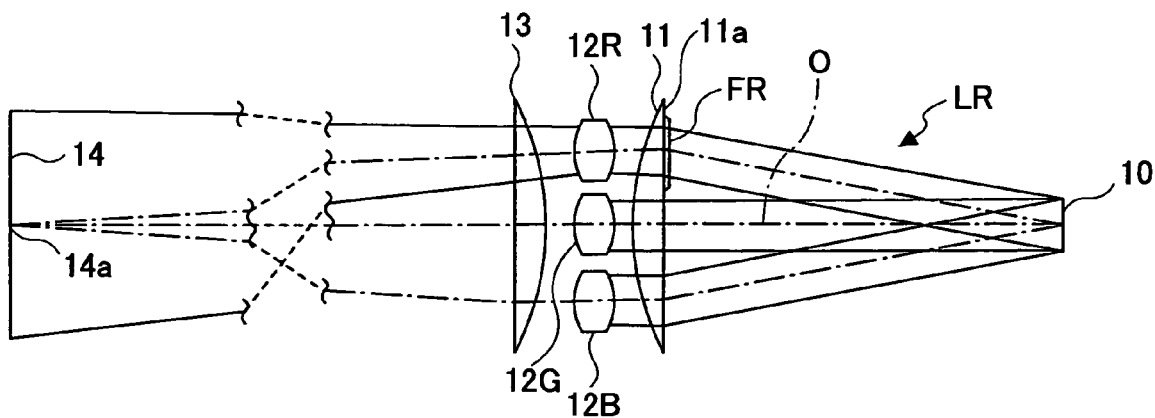
FIG. 2A is a side view of an optical system in the Related Art 2.
Figure 2B:
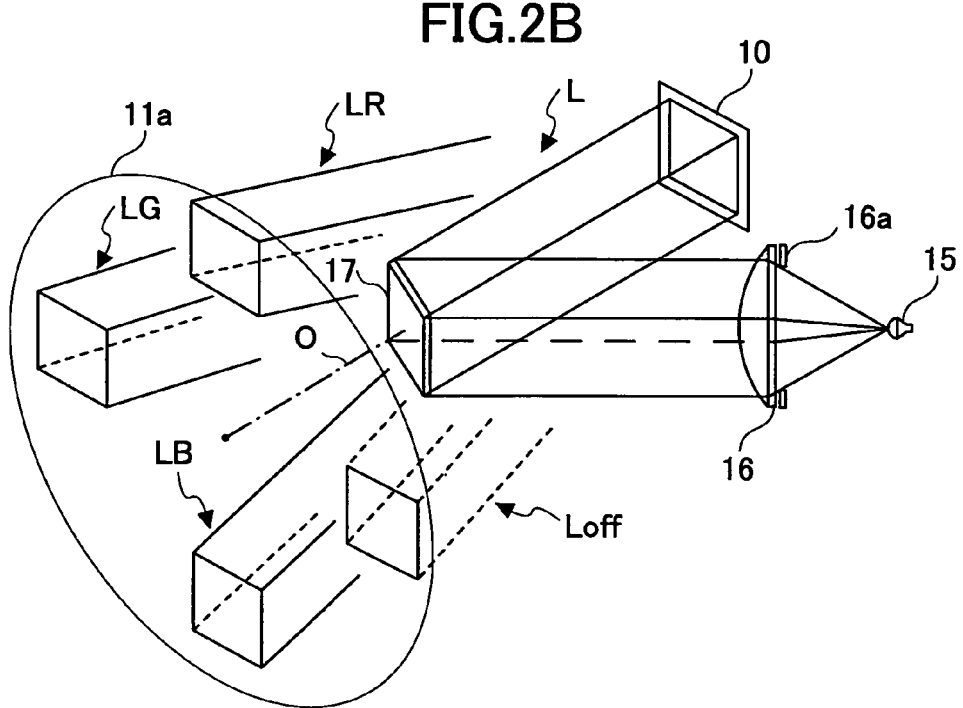
FIG. 2B is a perspective view showing a state of light fluxes output from a light source.
Figure 3A:
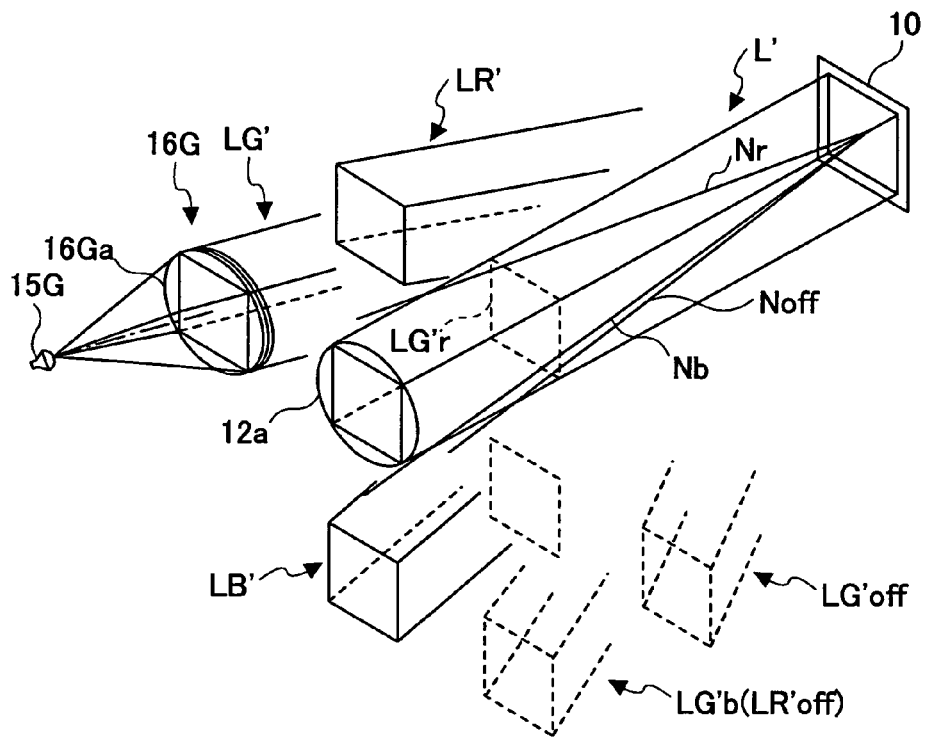
FIG. 3A is a perspective view showing a part of light source system for explaining the Related Art 3.
Figure 3B:
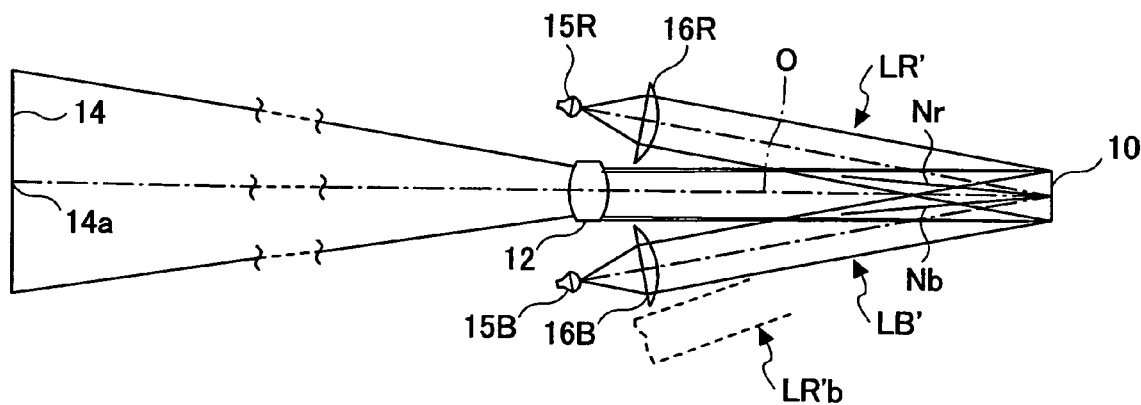
FIG. 3B is a side view of the light source system.
Figure 4B:
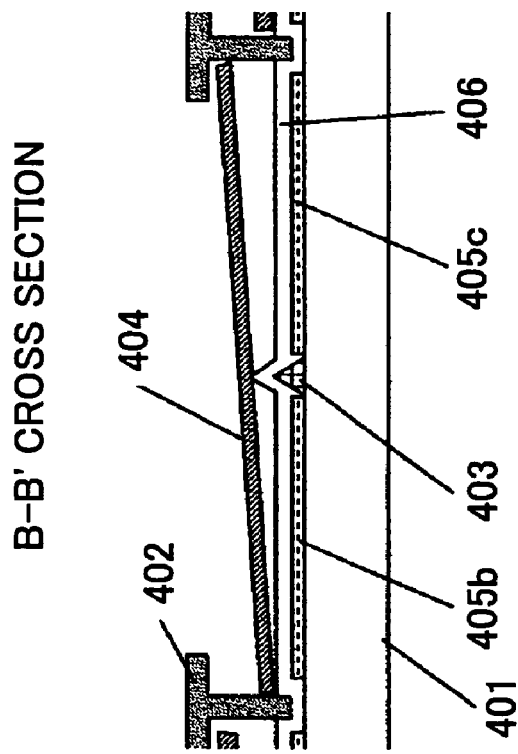
FIG. 4A and FIG. 4B are diagrams showing a configuration of the optical deflecting devices.
Figure 4A:
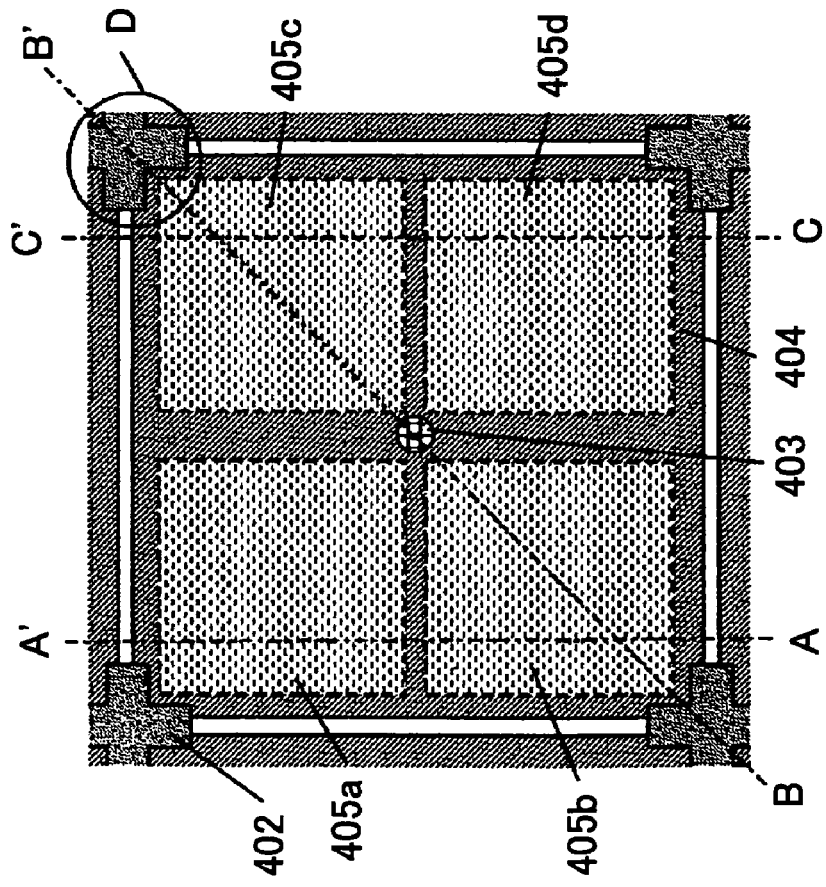
Figure 6:
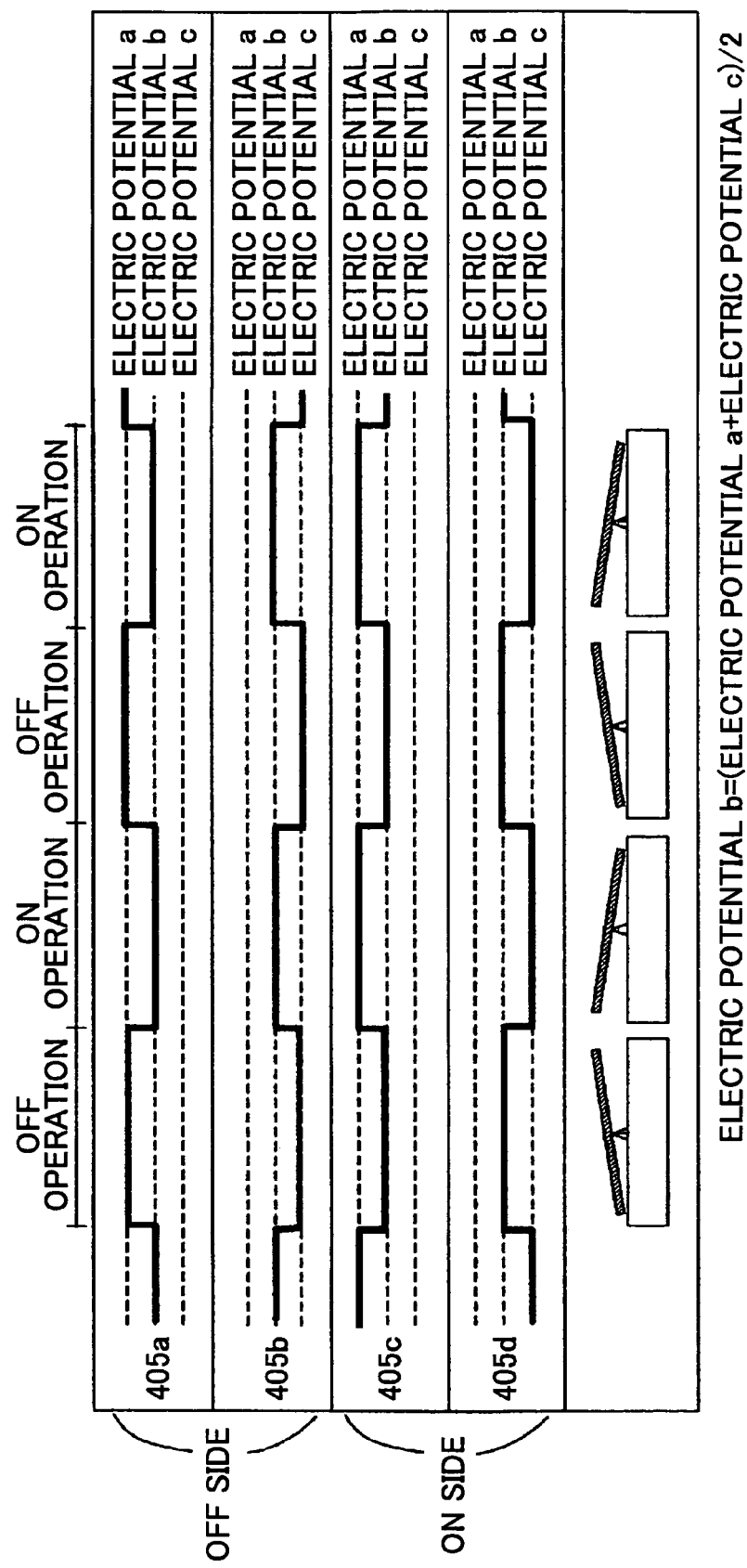
FIG. 6 shows a timing chart of the electric potentials applied to electrodes.

In the optical deflecting array 703, a plurality of the optical deflecting devices 706 for deflecting light to the two-axis directions are arranged in two dimensions. Each of the optical deflecting devices 706 independently selects two axes, and conducts the ON operation or the OFF operation in response to color information for each color. As the optical deflecting device 706, the optical deflecting device shown in FIG. 4A and FIG. 4B can be used. In the first embodiment, the optical deflecting device shown in FIG. 4A and FIG. 4B is used. The optical deflecting device in FIG. 4A and FIG. 4B can deflect light by arbitrarily changing a deflection axis with an electric potential applied to each of four electrodes facing the plate member being a mirror.

The reflected light (ON light) corresponding to the color information is led to the projection lens 704 by the ON operation of each of the optical deflecting devices of the optical deflecting array 703, and is projected to a screen by the projection lens 704. Then, an image is formed on the screen. It should be noted that an aperture diaphragm, which is not shown, is arranged on an arbitrary light path of the optical system. This aperture diaphragm may properly reform light, and prevents scattered light from reaching the projection lens 704.

The optical system according to the present invention includes one or more the optical deflecting arrays configured by an optical deflecting device group including a plurality of the deflecting devices deflecting light to the two-axis directions. Each of the optical deflecting devices of the optical deflecting device group receives the incoming light from two directions corresponding to respective deflection axes, reflects the incoming light from the two-axis directions in response to the color information, and leads the incoming light to the projection lens 704 for a given term for each color. Moreover, reflected light is led from the optical deflecting array 703 configured by the optical deflecting device group for deflecting light to the two-axis directions, to the projection lens 704, and a direction of the reflected light is a perpendicular direction with respect to both the reflected light corresponding to the incoming light in the two directions and a surface of the optical deflecting array 703.

The present invention will be further described with reference to FIG. 8A through FIG. 8D. The incoming light flux C1 including an arbitrary color enters the surface of the optical deflecting array 703 diagonally from above. In this case, when each of the optical deflecting devices 706 configuring the optical deflecting array 703 includes the color information with respect to the incoming light flux C1, each of the optical deflecting devices 706 conducts the ON operation with respect to the incoming light flux C1. That is, the plate member 404 as the mirror is inclined and displaced in a target direction by setting the B-B' line as a rotation axis. As a result, the incoming light flux C1 is reflected in a direction perpendicular to the surface of the optical deflecting array 703, and becomes the ON light C1(ON).

In the first embodiment according to the present invention, each direction of the ON light C1(ON) and the ON light C2(ON) is perpendicular to the surface of the optical deflecting array 703 (the same manner in the following second through four embodiments). However, a reflection direction is not limited to this feature.

When each of the optical deflecting devices 706 does not have the color information with respect to the incoming light flux C1, each of the optical deflecting devices 706 conducts the OFF operation with respect to the incoming light flux C1. That is, the plate member 404 as the mirror is inclined and displaced to a direction opposite to the direction of the ON operation by setting the B-B' line as the rotation axis. As a result, the incoming light flux C1 is reflected in a direction being departed from the projection lens 704 as the OFF light C1(OFF), and is absorbed by the light absorption plate 705.

On the other hand, the incoming light flux C2 including an arbitrary color other than the color of the incoming light flux C1 enters to the surface of the optical deflecting array 703 diagonally from above in another direction other than the direction in which the incoming light flux C1 enters. In this case, when each of the optical deflecting devices 706 configuring the optical deflecting array 703 includes the color information with respect to the incoming light flux C2, each of the optical deflecting devices 706 conducts the ON operation with respect to the incoming light flux C2. As a result, the incoming light flux C2 reflects to a direction perpendicular to the surface of the optical deflecting array 703, and becomes the ON light C2(ON).

In the first embodiment of the present invention, a direction of the ON light C2(ON) of the incoming light flux C2 is perpendicular to the surface of the optical deflecting array 703. However, a reflection direction of the incoming light flux C2 is not limited to this feature.

When each of the optical deflecting devices 706 does not have the color information with respect to the incoming light flux C2, each of the optical deflecting devices 706 conducts the OFF operation with respect to the incoming light flux C2. That is, the plate member 404 as the mirror is included and displaced to a direction opposite to the direction of the ON operation by setting the A-A' line as the rotation axis. As a result, the incoming light flux C2 is reflected in a direction being departed from the projection lens 704 as the OFF light C2(OFF), and is absorbed by the light absorption plate 705.

As described above, the incoming light fluxes C1 and C2 are always illuminated to the optical deflecting array 703. However, it is impossible to simultaneously conduct two optical deflections for the incoming light fluxes C1 and C2. Accordingly, in one frame time, it is required to divide the one frame time and separately conduct an optical deflection operation based on the color information of the incoming light flux C1 and another optical deflection operation based on the color information of the incoming light flux C2. For the sake of convenience, it is preferable to equally divide the one frame time into two, but it is not limited to divide in this manner. Alternatively, the one frame time may be appropriately divided based on brightness of each color, and assigned to each color. It should be noted that the incoming light fluxes C1 and C2 including the color information are projected and displayed by shifting time, and colors are combined by human eyes due to the residual images.

Moreover, in the first embodiment, the incoming light fluxes C1 and C2 form an angle of 90 degree, and enter from different directions. The angle of 90 degree for the different directions is preferable to avoid a mixed color of the incoming light fluxes C1 and C2. However, it is not limited to this manner. In the present invention, both directions of the ON light C1(ON) of the incoming light flux C1 and the ON light C2(ON) of the incoming light flux C2 are perpendicular to the surface of the optical deflecting array 703. By this configuration, since the direction of the ON light C1(ON) is identical to the direction of the ON light C2(ON), means such as a color combination prism is not required in the identical directions until the projection lens 704. That is, advantageously, colors are naturally combined.

Second Embodiment

Figure 9:
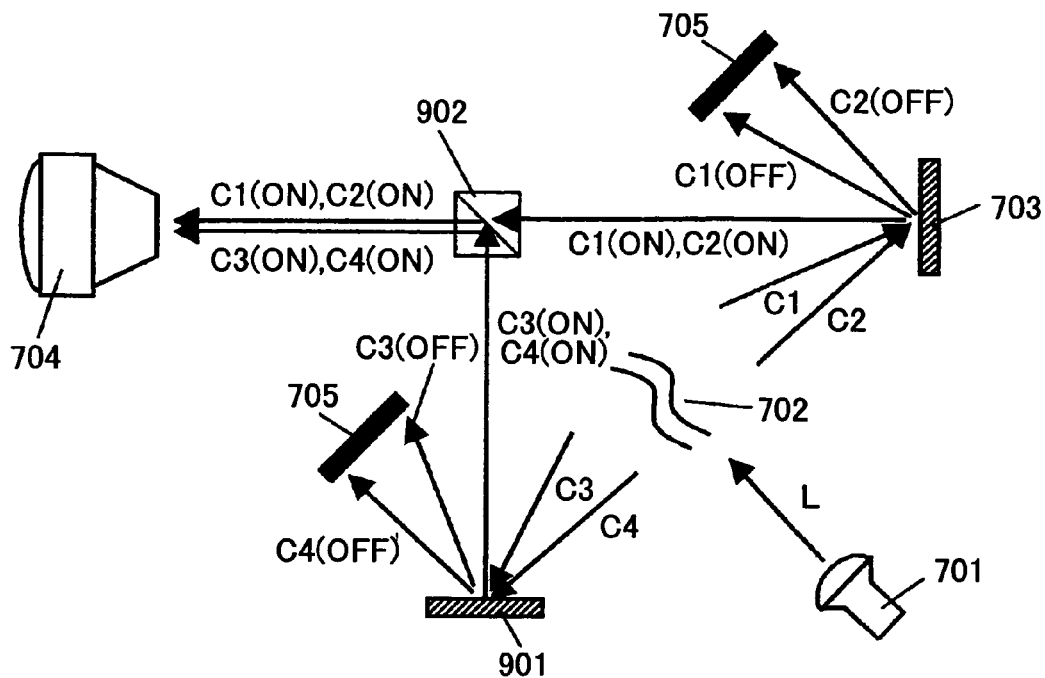
FIG. 9 is a diagram showing an optical system according to a second embodiment of the present invention.

FIG. 9 is a diagram showing an optical system according to a second embodiment of the present invention. In FIG. 9, a light source 701, a light flux L, an optical lens-mirror combination 702, a projection lens 704, and a light absorption plate 705 are the same as those in the first embodiment. Different from the first embodiment, the optical lens-mirror combination 702 in the second embodiment is a combination to separate a light flux L from the light source 701 into incoming light fluxes C1, C2, C3, and C4 of arbitrary colors, and to change directions so as to illuminate every two colors to two optical deflecting arrays 703 and 901.

Each of the optical deflecting arrays 703 and 901 is an optical deflecting array formed by an optical deflecting device group including a plurality of optical deflecting devices for deflecting light to two-axis directions. Similar to the first embodiment, in the second embodiment, the optical deflecting device group shown in FIG. 4A and FIG. 4B is used. The incoming light flux C1 is an incoming light flux of an arbitrary color toward the optical deflecting array 703, an ON light C1(ON) is an ON light of this color, and an OFF light C1(OFF) is an OFF light of the incoming light flux C1.

The incoming light flux C2 is an incoming light flux of another arbitrary color other than the color of the incoming light flux C1 and is directed to the optical deflecting array 703, an ON light C2(ON) is an ON light of this color, and an OFF light C2(OFF) is an OFF light of the incoming light flux C2. The incoming light flux C3 is an incoming light flux of other arbitrary color other than the colors of the incoming light fluxes C1 and C2 and is directed to the optical deflecting array 901, an ON light C3(ON) is an ON light of this color, and an OFF light is an OFF light C3(OFF). The incoming light flux C4 is an incoming light flux of other arbitrary color other than the colors of the incoming light fluxes C1, C2, and C3 and is directed to the optical deflecting array 901, an ON light C4(ON) is an ON light of this color, and an OFF light C4(OFF) is an OFF light of the incoming light flux C4.

For example, each of the incoming light fluxes C1, C2, C3, and C4 is one of the primary colors (R (Red), G (Green), and B (Blue)), the incoming light fluxes C1, C2, C3, and C4 have different frequencies from each other. Similar to the first embodiment, each of the incoming light fluxes C1, C2, C3, and C4 is a light beam having a width for illuminating the entire surface of the optical deflecting arrays 703 and 901. A color combination prism 902 outputs either one of the ON light C1(ON) and the ON light C2(ON) which are entered from different directions, and either one of the ON light C3(ON) and the ON light C4(ON) which enter from different directions, to the same direction toward the projection lens 704, and combines colors. Moreover, similar to the first embodiment, it should be noted that an aperture diaphragm, which is not shown, is arranged on an arbitrary light path of the optical system. This aperture diaphragm may properly reform light, and prevents scattered light from reaching the projection lens 704.

In the second embodiment of the present invention, the optical system includes two optical deflecting arrays 703 and 901. Both two optical deflecting arrays 703 and 901 receive two incoming light fluxes from two directions corresponding to respective deflection axes and reflect two incoming light fluxes to two-axis directions. Each of the two optical deflecting arrays 703 and 901 includes an optical deflecting device group for leading two incoming light fluxes coming from two directions to the projection lens 704 for an arbitrary time corresponding to the color information. Moreover, all incoming light fluxes entering to the two optical deflecting arrays 703 and 901 have different colors.

In FIG. 9, the incoming light fluxes C1 and C2 enter from two directions diagonally from above with respect to the surface of the optical deflecting array 703. In this case, when each of the optical deflecting devices forming the optical deflecting array 703 includes the color information with respect to the incoming light flux C1, each of the optical deflecting devices conducts the ON operation, and reflects the incoming light flux C1 as the ON light C1(ON). On the other hand, when each of the optical deflecting devices forming the optical deflecting array 703 does not include the color information with respect to the incoming light flux C1, each of the optical deflecting devices conducts the OFF operation, and reflects the incoming light flux C1 as the OFF light C1(OFF).

Moreover, when each of the optical deflecting devices forming the optical deflecting array 703 includes the color information with respect to the incoming light flux C2 entering diagonally from above with respect to the surface of the optical deflecting array 703, each of the optical deflecting devices conducts the ON operation, and reflects the incoming light flux C2 as the ON light C2(ON). On the other hand, when each of the optical deflecting devices forming the optical deflecting array 703 does not include the color information, each of the optical deflecting devices conducts the OFF operation, and reflects the incoming light flux C2 as the OFF light C2(OFF). It should be noted that the OFF light C1(OFF) and the OFF light C2(OFF) are absorbed by the light absorption plate 705.

Similar to the first embodiment as described above, it is impossible to always illuminate the incoming light fluxes C1 and C2 to the optical deflecting array 703, and simultaneously deflect the incoming light fluxes C1 and C2. Accordingly, in one frame time, it is required to divide the one frame time, and to separately conduct the optical deflection operation based on the color information of the incoming light flux C1 and the optical deflection operation based on the color information of the incoming light flux C2. Also, the optical deflecting array 901 conducts the optical deflection operation with respect to the incoming light fluxes C3 and C4 in the same manner. That is, the incoming light fluxes C3 and C4 enter the optical deflecting array 901 from different incoming directions, and each of the optical deflecting devices of the optical deflecting array 901 deflects the incoming light fluxes C3 and C4 to the ON light C3(ON), the ON light C4(ON) and the OFF light C3(OFF), and the ON light C4(OFF).

Next, the ON light C1(ON) and the ON light C2(ON) from the optical deflecting array 703, and the ON light C3(ON) and the ON light C4(ON) from the optical deflecting array 901 are led to the color combination prism 902, and are emitted to the projection lens 704 from the same direction. Thus, it is possible to combine four different colors by combining light by the color combination prism 902, and it is possible to display an image with a high color gradation on a screen.

In the second embodiment of the present invention as described above, light reflected from the optical deflecting array 703 and light reflected from the optical deflecting array 901 based on the color information are combined, and are led to the projection lens 704. Since the optical deflecting arrays 703 and 901 simultaneously conduct the optical deflection operation, either one of the ON light C1(ON) and the ON light C2(ON), and either one of the ON light C3(ON) and the ON light C4(ON) can be projected and displayed at the same time. That is, both the ON light C1(ON) and the ON light C2(ON) are not displayed at the same time, and both the ON light C3(ON) and the ON light C4(ON) are not displayed at the same time. However, the incoming light fluxes C1 and C2 projected and displayed by shifting time, and the incoming light fluxes C3 and C4 projected and displayed by shifting time are combined by the human eyes due to the residual image. Therefore, it is possible to eventually combine four colors on the projection screen and to see an image with a high fineness.

There are the following advantages in the second embodiment of the present invention. Each of the optical deflecting arrays 703 and 901 handles two colors as the color information. Thus, if it is assumed that a display time in one frame time is equally divided into two, a maximum display time can be 1.5 times longer than a case of dividing one frame time for three colors in Related Art 1 using the color wheel. Since the maximum display time becomes longer, two advantages can be described as follows: First, a light amount of each color projected and displayed to the screen in one frame time is increased. Thus, it is possible to increase a brightness of a projection image. It is assumed that light from the with light source 701 is divided into red, green, blue, and dark green to form the incoming light fluxes C1, C2, C3, and C4. The light amount of each color may be lower than the case of dividing into three for red, green, and blue in the optical system using the color wheel. However, it can be considered that the light amount in a color combination of the ON light is approximately the same per unit of time. Accordingly, since the display time becomes longer, the light amount is increased per one frame time, and the brightness is increased. Second, in a case of changing the display time for each color and displaying a gradation, it is possible to increase the number of gradations. If a frame rate is assumed to be 60 Hz, when color wheels of red, green, and blue are used to display each gradation at a time gradation, the maximum display time for each color in one frame time is 5.56 msec. when the display time is equally divided. When it is considered to display at the time gradation of 256 gradations in the maximum display time, the display time for one gradation becomes 21.8 μsec. If the maximum display time for each color becomes 1.5 times, and the number of gradations is calculated without changing the display time per gradation, it is possible to display 384 gradations for each color. That is, the number of gradations can be increased.

Third Embodiment

Figure 10:
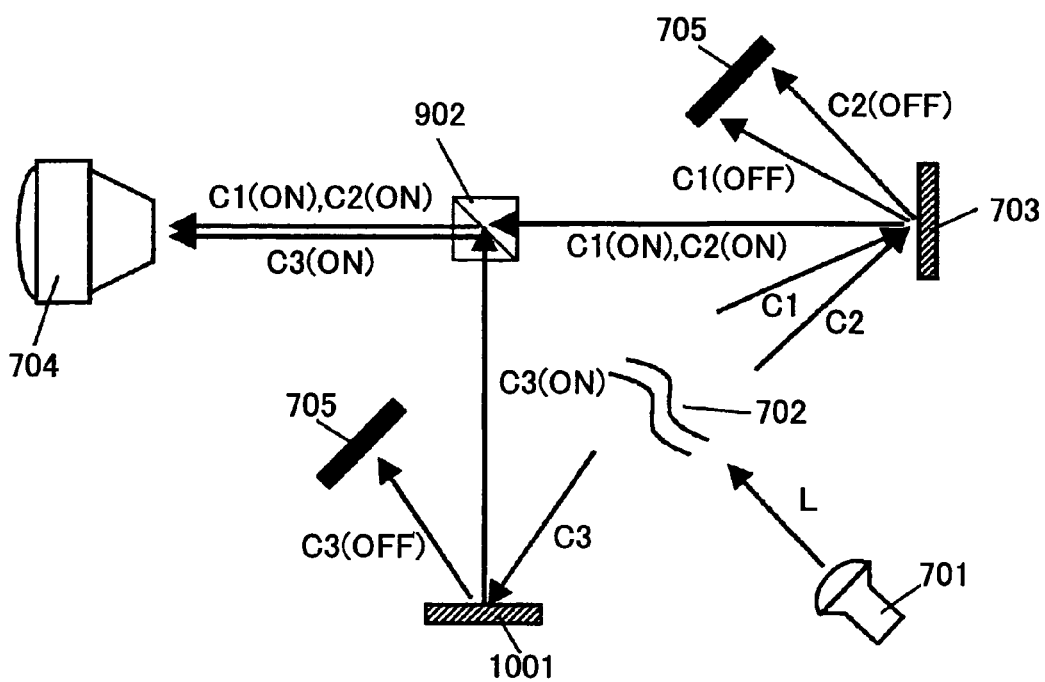
FIG. 10 is a diagram showing an optical system according to a third embodiment of the present invention.

FIG. 10 is a diagram showing an optical system according to a third embodiment of the present invention. In FIG. 10, a light source 701, a light flux L, an optical lens-mirror combination 702, a projection lens 704, and a light absorption plate 705 are the same as those in the first embodiment. Different from the first embodiment, the optical lens-mirror combination 702 in the third embodiment is a combination to separate a light flux L from the light source 701 into incoming light fluxes C1, C2, and C3 of arbitrary colors, and to change directions so as to emit two colors to an optical deflecting array 703 and to emit one color to an optical deflecting array 1001.

The optical deflecting array 703 is an optical deflecting array formed by an optical deflecting device group including a plurality of optical deflecting devices for deflecting light to two-axis directions. Also, in the third embodiment, the optical deflecting device group shown in FIG. 4A and FIG. 4B is used. The optical deflecting array 1001 is an optical deflecting array formed by an optical deflecting device group including a plurality of optical deflecting devices for deflecting light to one-axis direction. The optical deflecting device of the one-axis deflection disclosed in Japanese Laid-open Patent Application No. 2004-78136 can be used.

The incoming light flux C1 is an incoming light flux of an arbitrary color toward the optical deflecting array 703, an ON light C1(ON) is an ON light of this color, and an OFF light C1(OFF) is an OFF light of the incoming light flux C1. The incoming light flux C2 is an incoming light flux of another arbitrary color other than the color of the incoming light flux C1 and is directed to the optical deflecting array 703, an ON light C2(ON) is an ON light of this color, and an OFF light C2(OFF) is an OFF light of the incoming light flux C2. The incoming light flux C3 is an incoming light flux of other arbitrary color other than the colors of the incoming light fluxes C1 and C2 and is directed to the optical deflecting array 1001, an ON light C3(ON) is an ON light of this color, and an OFF light is an OFF light C3(OFF).

An incoming direction of the incoming light flux C3 toward the optical deflecting array 1001 and reflected directions of the ON light C3(ON) and the OFF light (OFF) may be the same directions viewed from an A-A' cross section shown in FIG. 8B. A color combination prism 902 outputs the ON light C1(ON) or the ON light C2(ON) and the ON light C3(ON) which enter from different directions, to the same direction toward the projection lens 704, and combines colors. Moreover, similar to the first embodiment, it should be noted that an aperture diaphragm, which is not shown, is arranged on an arbitrary light path of the optical system. This aperture diaphragm may properly reform light, and prevents scattered light from reaching the projection lens 704.

In the third embodiment of the present invention, the optical system includes two optical deflecting arrays 703 and 1001. As one optical deflecting array, the optical deflecting array 703 receives two incoming light fluxes from two directions corresponding to respective deflection axes and reflect two incoming light fluxes to two-axis directions. The optical deflecting array 703 includes an optical deflecting device group for leading two incoming light fluxes coming from two directions to the projection lens for an arbitrary time corresponding to the color information. As another optical deflecting array, the optical deflecting array 1001 receives one incoming light flux from one direction and reflects the incoming light flux to the one-axis direction. The optical deflecting array 1001 includes an optical deflecting device group for leading the incoming light flux coming from the direction to the projection lens for an arbitrary time corresponding to the color information. Moreover, all incoming light fluxes entering to both the optical deflecting arrays 703 and 1001 have different colors.

In FIG. 10, the incoming light fluxes C1 and C2 enter from two directions diagonally from above with respect to the surface of the optical deflecting array 703. In this case, when each of the optical deflecting devices forming the optical deflecting array 703 includes the color information with respect to the incoming light flux C1, each of the optical deflecting devices conducts the ON operation, and reflects the incoming light flux C1 as the ON light C1(ON). On the other hand, when each of the optical deflecting devices forming the optical deflecting array 703 does not include the color information with respect to the incoming light flux C1, each of the optical deflecting devices conducts the OFF operation, and reflects the incoming light flux C1 as the OFF light C1(OFF).

Moreover, when each of the optical deflecting devices forming the optical deflecting array 703 includes the color information with respect to the incoming light flux C2 entering diagonally from above with respect to the surface of the optical deflecting array 703, each of the optical deflecting devices conducts the ON operation, and reflects the incoming light flux C2 as the ON light C2(ON). On the other hand, when each of the optical deflecting devices forming the optical deflecting array 703 does not include the color information, each of the optical deflecting devices conducts the OFF operation, and reflects the incoming light flux C2 as the OFF light C2(OFF). It should be noted that the OFF light C1(OFF) and the OFF light C2(OFF) are absorbed by the light absorption plate 705. Similar to the first embodiment as described above, it is impossible to always illuminate the incoming light fluxes C1 and C2 to the optical deflecting array 703, and to simultaneously deflect the incoming light fluxes C1 and C2. Accordingly, in one frame time, it is required to divide the one frame time, and to separately conduct the optical deflection operation based on the color information of the incoming light flux C1 and the optical deflection operation based on the color information of the incoming light flux C2.

When each of the optical deflecting devices forming the optical deflecting array 1001 includes the color information with respect to the incoming light flux C3, each of the optical deflecting devices conducts the ON operation, and reflects the incoming light flux C3 as the ON light C3(ON). On the other hand, when each of the optical deflecting devices forming the optical deflecting array 703 does not include the color information, each of the optical deflecting devices conducts the OFF operation, and reflects the incoming light flux C3 as the OFF light C3(OFF). It should be noted that the OFF light C3(OFF) is absorbed by the light absorption plate 705.

Next, the ON light C1(ON) and the ON light C2(ON) from the optical deflecting array 703, and the ON light C3(ON) from the optical deflecting array 1001 are led to the color combination prism 902, and are emitted to the projection lens 704 from the same direction. Thus, it is possible to combine three different colors by combining light by the color combination prism 902, and it is possible to display an image with a high color gradation on a screen. Since the optical deflecting arrays 703 and 1001 simultaneously conduct the optical deflection operation, either one of the ON light C1(ON) and the ON light C2(ON), and the ON light C3(ON) can be projected and displayed at the same time. That is, both the ON light C1(ON) and the ON light C2(ON) are not displayed at that time. However, the incoming light fluxes C1 and C2 are projected and displayed by shifting time. Therefore, it is possible to eventually combine three colors on the projection screen and to see an image with a high fineness.

There are the following advantages in the third embodiment of the present invention. The optical deflecting array 703 handles two colors as the color information. Thus, if it is assumed that a display time in one frame time is equally divided into two, a maximum display time can be 1.5 times longer than a case of dividing one frame time for three colors in Related Art 1 using a color wheel. In addition, the optical deflecting array 1001 handles a single color as the color information. Since it is possible to use the entire one frame time as the display time only for the single color, a maximum display time can be 3 times longer than the case of dividing one frame time for three colors in Related Art 1 using the color wheel. Advantages of longer maximum display time are the same as the advantages in the optical system according to the second embodiment as described above, and effects of the advantages are further increased.

Fourth Embodiment

Figure 11:
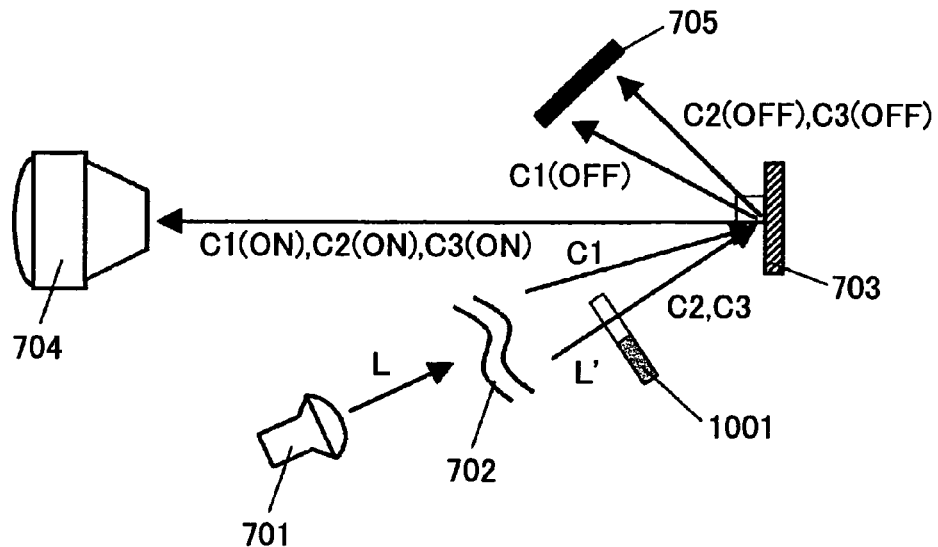
FIG. 11 is a diagram showing an optical system according to a fourth embodiment of the present invention.

FIG. 11 is a diagram showing an optical system according to a fourth embodiment of the present invention. In FIG. 11, a light source 701, a light flux L, an optical lens-mirror combination 702, an optical deflecting array 703, a projection lens 704, and a light absorption plate 705 are the same as those in the first embodiment. Different from the first embodiment, the optical lens-mirror combination 702 in the fourth embodiment is a combination to separate a light flux L from the light source 701 into incoming light flux C1 and a light flux L' of arbitrary colors, and to change directions so as to emit to the optical deflecting array 703. Moreover, the light flux L' passes a color wheel 1101 before the light flux L' is illuminated to the optical deflecting array 703, and the light flux L' is separated into incoming light fluxes C2 and C3 of different colors by time sharing.

Similar to the first, second, and third embodiment, the incoming light flux C1, an ON light C1(ON), an OFF light C1(OFF), an incoming light flux C2, an ON light C2(ON), an OFF light C2(OFF), an incoming light flux C3, an ON light C3(ON), and an OFF light C3(OFF) are the incoming fluxes, the ON light fluxes, and the OFF light fluxes of different colors, respectively. Moreover, similar to the first embodiment, it should be noted that an aperture diaphragm, which is not shown, is arranged on an arbitrary light path of the optical system. This aperture diaphragm may properly reform light, and prevents scattered light from reaching the projection lens 704.

In the fourth embodiment of the present invention, the optical system includes one optical deflecting array 703. The optical deflecting array 703 receive two incoming light fluxes from two directions corresponding to respective deflection axes and reflects two incoming light fluxes to two-axis directions. The optical deflecting array 703 includes an optical deflecting device group for leading two incoming light fluxes coming from two directions to the projection lens for an arbitrary time corresponding to the color information. Moreover, in two incoming light fluxes entering to the optical deflecting devices from two directions, one incoming light flux from at least one of two directions is further switched to be another incoming light flux of a different color at an arbitrary time or period so that all incoming light fluxes entering to one optical deflecting array include different colors.

In FIG. 11, the incoming light flux C1 enters from one direction diagonally from above with respect to the surface of the optical deflecting array 703. In addition, the incoming light fluxes C2 and C3 are switched at an arbitrary time and enter from another direction diagonally from above with respect to the surface of the optical deflecting array 703. A switching speed for the incoming light fluxes C2 and C3 is determined based on a rotation speed of the color wheel 1101. In this case, when each of the optical deflecting devices forming the optical deflecting array 703 includes the color information with respect to the incoming light flux C1, each of the optical deflecting devices conducts the ON operation, and reflects the incoming light flux C1 as the ON light C1(ON). On the other hand, when each of the optical deflecting devices forming the optical deflecting array 703 does not include the color information with respect to the incoming light flux C1, each of the optical deflecting devices conducts the OFF operation, and reflects the incoming light flux C1 as the OFF light C1(OFF).

Moreover, when each of the optical deflecting devices forming the optical deflecting array 703 includes the color information with respect to the incoming light flux C2 or C3 entering diagonally from above with respect to the surface of the optical deflecting array 703, each of the optical deflecting devices conducts the ON operation, and reflects the incoming light flux C2 or C3 as the ON light C2(ON) or C3(ON). On the other hand, when each of the optical deflecting devices forming the optical deflecting array 703 does not include the color information, each of the optical deflecting devices conducts the OFF operation, and reflects the incoming light flux C2 or C3 as the OFF light C2(OFF) or C3(OFF). It should be noted that the OFF light C1(OFF), the OFF light C2(OFF), and the OFF light C3(OFF) are absorbed by the light absorption plate 705.

Similar to the first embodiment as described above, it is impossible to always illuminate the incoming light fluxes C1, and C2 or C3 to the optical deflecting array 703, and to simultaneously deflect the incoming light fluxes C1, C2, and C3. Accordingly, in one frame time, it is required to divide the one frame time, and to separately conduct the optical deflection operation based on the color information of the incoming light flux C1, the optical deflection operation based on the color information of the incoming light flux C2, and the optical deflection operation based on the color information of the incoming light flux C3. However, the incoming light fluxes C1, C2, and C3 are projected and displayed by shifting time. Therefore, it is possible to eventually combine three colors on the projection screen and to see an image with a high fineness.

There are the following advantages in the fourth embodiment of the present invention. That is, it is possible to project and display a color image, for example, with three primary colors of red, green, and blue, by using a single optical deflecting array alone, and a prism for a color combination is not required. Advantageously, the optical system can be minimized and less expensive.

Fifth Embodiment

A method for suppressing color flicker and a color information display method in a fifth embodiment according to the present invention can be applied in common to the optical systems according to the first embodiment through the fourth embodiment.

As described above, color flicker is also called color breaking, which is a phenomenon in that light like a rainbow can be seen in a moment when human eyes see an image projected on a screen. In an optical system that projects an image by successively changing colors by using a color wheel such as Related Art 1, a phenomenon of color flicker is caused since three primary colors: red, green, and blue are successively displayed on the screen, and colors cannot be combined due to differences of a color combination ability among individuals or due to a timing of moving a visual line when the colors are combined by a residual image.

In order to solve the above-described problem, the optical system is required that the colors should not be switched by time or that time for all pixels to display a single color on a projection screen should be significantly shortened. In the first case in that the colors are not switched at all, it is required to prepare optical deflecting arrays corresponding to three primary colors: red, green, and blue, and to combine ON lights of the three primary colors to display the image. However, in this configuration, the size of the optical system becomes larger, and three optical deflecting arrays are required. As a result, a cost of an image projection displaying apparatus is significantly increased.

In the optical systems according to the first embodiment through the fourth embodiment of the present invention, one or two optical deflecting arrays are used. However, it is possible to suppress an increase of the cost of the image projection displaying apparatus. In addition, it is possible to suppress an increase of the size of the optical system. Moreover, it is possible to overcome the problem of color flicker. As a common feature of the optical systems according to the first embodiment through the fourth embodiment of the present invention, with respect to an optical deflecting array formed by an optical deflecting device group including a plurality of optical deflecting devices for deflecting light to two-axis directions, incoming light fluxes of different colors enter from two directions to the optical deflecting array, and a color combination is conducted to ON light from two directions, respective ON light reflected at the optical deflecting devices. In other words, compared to Related Art 1 using the color wheel to switch colors, in the present invention, a color switch is conducted by switching an axis of an optical deflection of each of the optical deflecting devices forming the optical deflecting array.

As described above, in the color switch by using the color wheel in Relate Art 1, the color switch approximately takes 0.93 msec which is relatively slower, and all optical deflecting devices arranged on the optical deflecting array are required to display the same color. Accordingly, while viewing an image on the project screen, human eyes see a single color with a size such that the human eyes can recognize the single color. As a result, the problem of color flicker occurs.

On the contrary, each of the first embodiment through the fourth embodiment of the present invention has common advantages as follows: first, it is possible to display colors by selecting two colors per each of the optical deflecting devices. Therefore, it can be realized that a single color is not displayed at the projection screen with a size such that the human eyes can recognize the single color. Second, since it is possible for each of the optical deflecting devices to switch two colors in time for one gradation of the time gradation, a display time per gradation becomes dozens of micro seconds. Therefore, the color switch can be realized at higher speed.

Moreover, in the second embodiment and the third embodiment, two optical deflecting arrays are used. Thus, it is possible to combine different colors at the same time. According to the above-described advantages, the optical system according to the present invention can realize to significantly reduce a time for displaying a single color by all pixels on the projection screen (in practice, all pixels are not required to simultaneously display the single color). Therefore, it is possible to significantly suppress color flicker.

Figure 12:
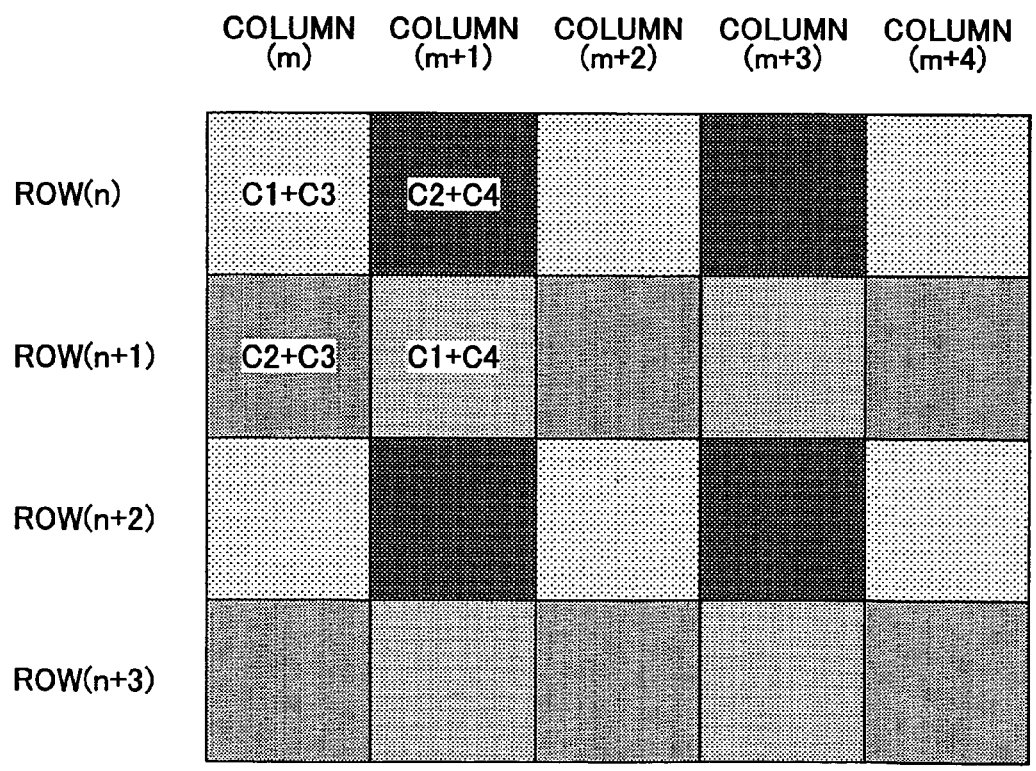
FIG. 12 is a diagram for explaining a color information displaying method according to a fifth embodiment of the present invention.

FIG. 12 is a diagram for explaining the color information displaying method according to the fifth embodiment of the present invention. In FIG. 12, 20 pixels are selected from an arbitrary area projected and displayed on the project screen, and colors displayed at an arbitrary time (that is, arbitrary moment) are shown. However, in practice, there are colors which are not displayed based on the color information because of the time gradation for each color.

An optical system used in the fifth embodiment is the optical system in the second embodiment shown in FIG. 9. In the second embodiment, colors of incoming light fluxes C1 and C2 are projected and displayed through an optical deflecting array 703 capable of deflecting light to two-axis directions, and colors of incoming light fluxes C3 and C4 are projected and displayed through an optical deflecting array 901 capable of deflecting light to the other two-axis directions.

In the fifth embodiment of the present invention, the optical system includes at least one optical deflecting array. The optical deflecting array receives two incoming light fluxes from two directions corresponding to respective deflection axes and reflects two incoming light fluxes to two-axis directions. The optical deflecting array includes an optical deflecting device group for leading two incoming light fluxes coming from two directions to the projection lens for an arbitrary time corresponding to the color information. Moreover, the optical deflecting devices being approximately adjacent to each other lead incoming light fluxes of different colors to the projection lens in different deflection axes.

In detail, in the fifth embodiment, when a pixel is specified by (row, column), a color of the incoming light flux C1 is displayed at (n, m), (n, m+2), (n, m+4), (n+1, m+1), (n+1, m+3), (n+2, m), (n+2, m+2), (n+2, m+4), (n+3, m+1), and (n+3, m+3), and a color of the incoming light flux C2 is displayed at (n, m+1), (n, m+3), (n+1, m), (n+1, m+2), (n+1, m+4), (n+2, m+1), (n+2, m+3), (n+3, m), (n+3, m+2), and (n+3, m+4). In the present invention, the optical deflection axes in each of the optical deflecting devices are changed to display colors. Therefore, it is possible to display different colors.

As described above, by displaying different colors at pixels being approximately adjacent to each other, it is possible to suppress color flicker. Moreover, in the fifth embodiment, the same color information displaying method is applied to the optical deflecting array 901.

In detail, a color of the incoming light flux C3 is displayed at (n, m), (n, m+2), (n, m+4), (n+1, m), (n+1, m+2), (n+1, m+4), (n+2, m), (n+2, m+2), (n+2, m+4), (n+3, m), (n+3, m+2), and (n+3, m+4), and a color of the incoming light flux C4 is displayed at (n, m+1), (n, m+3), (n+1, m+1), (n+1, m+3), (n+2, m+1), (n+2, m+3), (n+3, m+1), and (n+3, m+3).

The color of the incoming light flux C1 or C2 and the color of the incoming light flux C3 or C4 are combined by a color combination prism 902, pass the projection lens 704, and form an image on the projection screen. Therefore, it is possible for four pixels being adjacent to each other to display different colors, respectively. Moreover, it is possible to suppress color flicker. In the fifth embodiment, the color information displaying method in that a different color is displayed for each pixel is applied. Alternatively, if a single color is displayed with a sufficiently smaller size such that the human eyes can not recognize the single color, a similar display method for displaying a different color per unit of a few pixels or per unit of dozens of pixels can be applied.

Sixth Embodiment

Figure 13A:
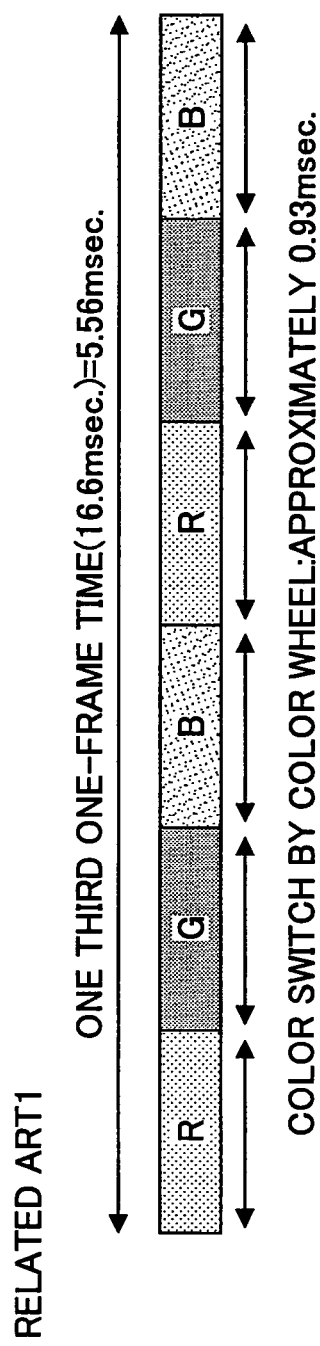
FIG. 13A and FIG. 13B are diagrams for explaining a color information displaying method according to a sixth embodiment of the present invention.
Figure 13B:
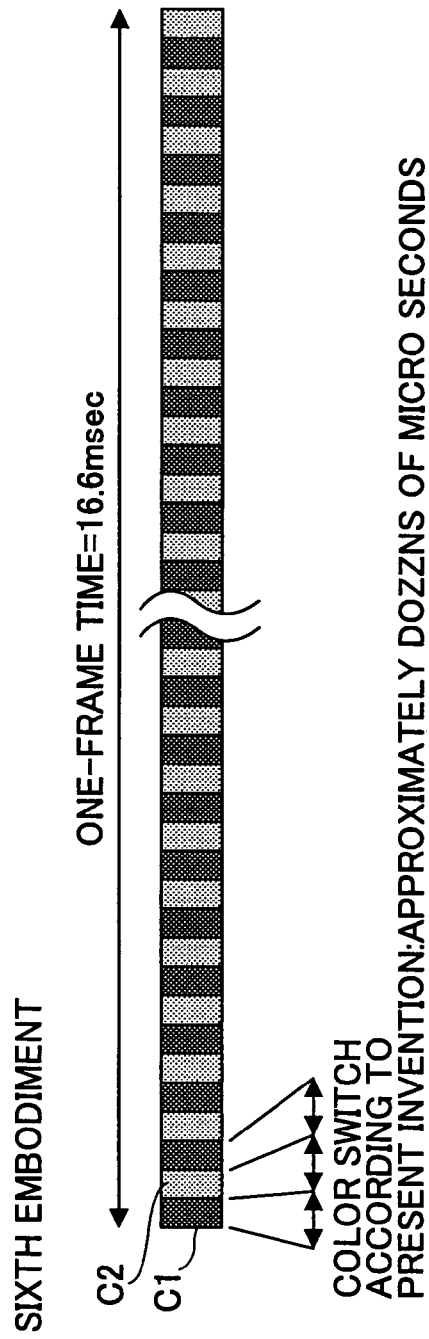

FIG. 13A and FIG. 13B are diagrams for explaining a color information displaying method according to a sixth embodiment of the present invention. FIG. 13A is a diagram showing a color switch by using a color wheel of Related Art 1, and FIG. 13B is a diagram showing a color switch conducted by changing deflection axes of each of optical deflecting devices according to the sixth embodiment of the present invention.

The color information displaying method in the sixth embodiment uses an optical system according to the first embodiment. In the first embodiment, colors of incoming light fluxes C1 and C2 pass an optical deflecting array 703 capable of deflecting light to two-axis direction, are alternately projected on a projection screen 704 by shifting time, and form an image on the projection screen 704.

In the color information displaying method according to the sixth embodiment of the present invention, in the optical system including at least one optical deflecting array including an optical deflecting device group of a plurality of optical deflecting devices for deflecting light to two-axis directions in that incoming light fluxes are received from two directions corresponding to the two-axis directions and are led to a projection lens in the two directions at respective arbitrary different time, a switch of a light deflection between two axes is conducted at several times in one frame display time.

That is, in the one frame display time, a switch of two colors to display is conducted at several times in the sixth embodiment, different from methods in that the switch of two colors to display is conducted at only one time. In Related Art 1 shown in FIG. 13A, as describe above, a color wheel is used as six color wheel of R, G, B, R, G, and B (three colors×2), and a wheel rotation speed is set to be three times higher, so that R, G, B, R, G, and B are displayed in one third the one frame time. If it is assumed that the display time is equal for each color, in a case in that a frame rate is 60 Hz, the maximum display time for each color, that is, a switch time for switching colors becomes 0.93 msec.

On the contrary, in the color information displaying method according to the sixth embodiment shown in FIG. 13B, if the one frame time is 16.6 msec., for example, the color switch is conducted by switching optical deflection axes of each of the optical deflecting devices at dozens of approximately micro seconds, which is shorter than 21.8 μsec. for one gradation display time. By this configuration, it is possible to suppress color flicker by conducting the color switch at higher speed.

Seventh Embodiment

An optical deflecting device according to a seventh embodiment of the present invention will be described. The optical deflecting device according to the seventh embodiment is the optical deflecting device used in the optical systems according to the first embodiment through the fourth embodiment for deflecting light to two-axis directions. The optical deflecting device in the seventh embodiment includes a substrate, a plurality of controlled members, a fulcrum member, a plate member, and a plurality of electrodes. Each of the plurality of controlled members includes a stopper at an upper potion. The plurality of controlled members are arranged at a plurality of edges of the substrate, respectively. The fulcrum member includes a nib, and is arranged on an upper surface of the substrate. The plate member does not include a fixed end, but includes the light reflection area on an upper surface, and includes a electric conductor layer formed by a member being electrically conductive partially at least. The plate member is movably arranged in a space forming by the substrate, the fulcrum member, the stoppers of the plurality of controlled members. The plurality of electrodes are respectively arranged on the substrate, and approximately face toward the electric conductor layer of the plate member.

That is, the optical deflecting device shown in FIG. 4A and FIG. 4B is used. The advantages, the configuration, the driving method are described above.

Eighth Embodiment

FIG. 14 is a diagram showing an image projection displaying apparatus according to an eighth embodiment of the present invention. The image projection displaying apparatus in the eighth embodiment uses at least one of the optical systems in the first embodiment through the fourth embodiment as a projection optical system, and uses at least one of the color information displaying methods in the fifth embodiment and the sixth embodiment.

The image projection displaying apparatus 1400 in the eighth embodiment uses the optical system in the second embodiment, and applies the color information displaying method in the fifth embodiment. The information displaying method is described above, and the explanation thereof will be omitted.

The image projection displaying apparatus 1400 will be described with reference to FIG. 14. A light flux L emitted from a white color light source 701 of a mercury lamp includes red (R), green (G), dark green (DG), and blue (B). The light flux L is reflected at an IR cut mirror 1401 while the IR cut mirror cuts infrared light, and enters a rod lens 1402. After the light flux L is formed to be approximately parallel light by the rod lens 1402, light of blue (B) and dark green (DG) is reflected by a dichroic mirror 1403, and light of red (R) and green (G) is filtered out by the dichroic mirror 1403. It should be noted that the light of blue (B) and dark green (DG) is light having a successive wavelength, and also the light of red (R) and green (G) is light having a successive wavelength.

First, the light of blue (B) and dark green (DG) is reflected by the entire reflection mirror 1404, and is separated to reflected light B and transmitted light DG by the dichroic mirror 1406. The reflected light B enters an optical deflecting array 703 capable of deflecting light to two-axis directions, from a diagonal upper direction with respect to a surface of the optical deflecting array 703, and ON light of blue (B) is reflected to a normal line of the surface of the optical deflecting array 703, and transmits toward a color combination prism 902. In FIG. 14, it appears that light of blue (B) enters from a direction perpendicular to the surface of the optical deflecting array 703, since the surface of the optical deflection array 703 is drawn as the surface is perpendicular to a diagram sheet in a two dimensional diagram. The light of blue (B) is reflected to a diagonal upper direction with respect to the surface of the optical deflecting array 703, and absorbed by a light absorption plate 705.

Next, the transmitted light DG filtered out by the dichroic mirror 1406 enters an optical deflecting array 901 capable of deflecting light to two-axis directions, which is another optical deflecting array, from a diagonal upper direction with respect to the surface of the optical deflecting array 901. The ON light of dark green (DG) is reflected to a normal line of the surface of the optical deflecting array 901, and transmits toward the color combination prism 902. In FIG. 14, it appears that light of dark green (DG) enters from a direction perpendicular to the surface of the optical deflecting array 901, since the surface of the optical deflection array 901 is also drawn as the surface is perpendicular to a diagram sheet in a two dimensional diagram. An OFF light of dark green (DG) is reflected to a diagonal direction with respect to the surface of the optical deflecting array 901, and is absorbed by another light absorption plate 705.

The successive light of red (R) and green (G) filtered out by the dichroic mirror 1403 is separated into reflected light G and transmitted light R by another dichroic mirror 1405. The reflected light G enters the optical deflecting array 703 capable of deflecting light to the two-axis directions from the diagonal upper direction with respect to the surface of the optical deflecting array 703. ON light of green (G) is reflected to the normal line of the surface of the optical deflecting array 703, and transmits toward the color combination prism 902. OFF light of green (G) is reflected to a diagonal upper direction with respect to the surface of the optical deflecting array 703, and is absorbed by the light absorption plate 705.

The transmitted light R filtered out by the dichroic mirror 1405 enters the optical deflecting array 902 capable of deflecting light to the two-axis directions from the diagonal upper direction with respect to the surface of the optical deflecting array 902. ON light of red (R) is reflected to the normal line of the surface of the optical deflecting array 901, and transmits toward the color combination prism 902. OFF light of red (R) is reflected to the diagonal direction with respect to the surface of the optical deflecting array 901, and is absorbed by the light absorption plate 705. It should be noted that light of blue (B) and light of green (G) enter the optical deflecting array 703 from two directions which axes are different, and light of dark green (DG) and light of red (R) enter the optical deflecting array 901 from two directions which axes are different.

As described above, the ON light of red (R), the ON light of green (G), the ON light of dark green (DG), and the ON light of blue (B) enter the color combination prism 902, are combined and emitted toward the projection lens 704, and form an image on a projection screen through the projection lens 704.

According to the present invention, the optical system includes at least one optical deflecting array formed by an optical deflecting device group including a plurality of the optical deflecting devices for deflecting light to two-axis directions, in which the incoming light fluxes enter the plurality of the optical deflecting devices from two directions respectively corresponding to two axes, the incoming light fluxes have different colors to each other, the incoming light fluxes in the two direction are reflected based on color information, and each of reflected light fluxes is led to a projection lens at an arbitrary time. Therefore, it is possible to display different colors by switching deflection axes, and it is possible for human eyes to combine colors by residual images (for example, color combination between two colors). Moreover, it is possible to display different colors for each of the optical deflecting devices by changing axes individually for each of the optical deflecting devices and deflecting light based on changed axes. Furthermore, since each of deflection axes is switched by displacing a plate member, it is possible to conduct a color switch at higher speed (two to three digits higher) than another color switch by rotating a color wheel described in related arts, and it is possible to provide the optical system capable of significantly suppressing color flicker.

According to the present invention, regarding a direction of reflected light fluxes, which are reflected by the optical deflecting array formed by the optical deflecting device group for deflecting light to the two-axis directions, and are led to the projection lens, the direction of the reflected light fluxes corresponding to the incoming light fluxes in both two directions is perpendicular to a surface of the optical deflecting array. Therefore, a prism and a lens for the color combination are not required because the reflected light fluxes transmit in the same direction. As a result, it is possible to minimize the size of the optical system and to decrease a cost of the optical system.

According to the present invention, two optical deflecting arrays are used, and each of two optical deflecting arrays is formed by an optical deflecting device group including a plurality of the optical deflecting devices for deflecting light to two-axis directions, in which the incoming light fluxes enter the plurality of the optical deflecting devices from two directions respectively corresponding to two axes, the incoming light fluxes in the two direction are reflected based on color information, and each of reflected light fluxes is led to the projection lens at an arbitrary time. In addition, the incoming light fluxes entering two optical deflecting arrays have different colors to each other. Therefore, it is possible to display colors by combining four colors, and it is possible to provide the optical system which can display the full-color image with higher color tone. Moreover, in a case of the color switch using a color wheel, at least three colors are required. On the contrary, in the present invention, since the color switch in each of the optical deflecting arrays has two colors, a display time for each color in one frame time can be at least 1.5 times longer than the case of using the color wheel. Therefore, it is possible to improve brightness. Also, it is possible to improve gradation display by increasing the number of gradations. Furthermore, since the optical system can be realized without using the color wheel, it is possible to solve the above-described problems which occur in the optical system using the color wheel.

According to the present invention, two optical deflecting arrays are used, one optical deflecting array deflects light to two-axis directions, and another optical deflecting array deflects light to one-axis direction. The one optical deflecting array is formed by an optical deflecting device group including a plurality of the optical defecting devices in that incoming light fluxes enter from two directions respectively corresponding to deflection axes, and each of the incoming light fluxes in the two directions are led to the projection lens at a respective arbitrary time based on color information. The another optical deflecting array is formed by an optical deflecting array including a plurality of optical deflecting devices in which an incoming light flux enters from one direction and is led to the projection lens based on the color information at an arbitrary time. In addition, all incoming light fluxes entering both two optical deflecting arrays have different colors to each other. Therefore, it is possible to display colors by combining three colors, and it is possible to provide the optical system which can display a full-color image. Moreover, in the case of the color switch using the color wheel, at least three colors are switched. On the contrary, in the present invention, two colors are switched in the optical deflecting array of two-axis deflection, and one color is displayed without the color switch in the optical deflecting array of one-axis deflection. In a case of two colors, the display time for each color in one frame time can be at least 1.5 times longer than the case of using the color wheel, and in a case of one color, the display time in one frame time can be 3 times longer than the case of using the color wheel since the color switch is not required. Moreover, since the optical system can be realized without using the color wheel, it is possible to solve the above-described problems which occur in the optical system using the color wheel.

According to the present invention, reflected light fluxes reflected from two optical deflecting array are optically combined based on the color information, and are led to the single projection lens. Therefore, it is possible to realize color display with three or four colors.

Accordingly to the present invention, one optical deflecting array is used, and the optical deflecting array deflects light to two-axis directions. The optical deflecting array is formed by an optical deflecting device group including a plurality of optical deflecting devices for deflecting light to two-axis directions, in which incoming light fluxes enter from two directions respectively corresponding to deflection directions, each of the incoming light fluxes in two directions is led to the projection lens based on color information at a respective arbitrary time. In addition, in the incoming light fluxes entering the optical deflecting devices in the two directions, an incoming light flux in at least one direction is further switched to another incoming light flux including a different color at an arbitrary time or period, and all incoming light fluxes entering one optical deflecting array have different colors to each other. Therefore, it is possible to realize color display with more than three colors, and to provide the optical system without a prism and lens for a color combination. As a result, it is possible to minimize the size of the optical system and to decrease a cost of the optical system.

According to the present invention, at least one optical deflecting array is used. The optical deflecting array is formed by a an optical deflecting device group including a plurality of the optical deflecting devices for deflecting light to two-axis directions, in which incoming light fluxes enter from two directions respectively corresponding to deflection directions, each of the incoming light fluxes in two directions is led to the projection lens based on color information at a respective arbitrary time. In the optical deflecting device group, optical deflecting devices being adjacent to each other lead the incoming light fluxes having different colors based on different deflection axes at an arbitrary time. Therefore, instead of displaying a single color on the entire surface of the projection screen at an arbitrary moment, it is possible to significantly suppress color flicker.

According to the present invention, at least one optical deflecting array is used. The optical deflecting array is formed by an optical deflecting device group including a plurality of optical deflecting devices for deflecting light to two-axis directions, in which incoming light fluxes enter from two directions respectively corresponding to deflection directions, each of the incoming light fluxes in two directions is led to the projection lens based on color information at a respective arbitrary time. In addition, an optical deflection switch is conducted between two axes in one frame display time multiple times. Therefore, it is possible to significantly reduce time for displaying each color once without changing a display time accumulated for each color, and it is possible to significantly suppress color flicker.

An optical deflecting device according to the present invention includes a substrate, a plurality of controlled members, a fulcrum member, a plate member, and a plurality of electrodes. In the optical deflecting device, each of the plurality of the controlled members includes a stopper at an upper portion, and the plurality of the controlled members are arranged at a plurality of ends of the substrate, the fulcrum member includes a nib, and is arranged on an upper surface of the substrate, the plate member does not include a fixed end, includes an optical reflection area on an upper surface, includes an electric conductor layer formed by a layer member including at least one portion being electrically conductive, is movably arranged in a space formed by the substrate, the fulcrum member, and the stoppers of the controlled members, and the plurality of electrodes are arranged on the substrate, and approximately face toward the electric conductor layer of the plate member. Accordingly, an optical deflection angle can be controlled easily and stably, a higher optical deflection can be realized, a longer duration can be realized, the optical deflecting device can be driven by a lower voltage, and a contrast ratio can be improved. Moreover, since a minimization can be realized, it is possible to highly integrate a plurality of the optical deflecting devices as an optical deflecting array. Furthermore, it is possible to easily realize a two-axis deflection.

According to the present invention, it is possible to significantly suppress color flicker, and it is possible to provide an image projection displaying apparatus with superior color reproduction.

The present invention is not limited to the specifically disclosed embodiments, and variations and modifications may be made without departing from the scope of the present invention.

The present application is based on the Japanese Priority Application No. 2004-305375 filed on Oct. 20, 2004, the entire contents of which are hereby incorporated by reference.

What is claimed is:

1. An optical system, comprising:
    an optical deflecting array including a plurality of optical deflecting devices arranged in a two-dimensional array, each of optical deflecting devices displacing a member having an optical reflection area and deflecting light, so that an incoming light flux entering the optical reflection area is deflected to a reflection direction being changed;
    a light source illuminating the optical deflecting array; and
    a projection lens projecting reflected light from the optical deflecting array based on color information,
    wherein:
    the plurality of the optical deflecting devices is formed as an optical deflecting device group, and each of the optical deflecting devices deflects light to two-axes, in four directions by individually operating two deflection axes;
    incoming light fluxes having different colors enter each of the optical deflecting devices from two directions respectively corresponding to the two deflection axes, and are reflected to one direction by shifting time in each optical deflection operation of the optical deflecting devices based on the color information; and
    each of reflected light fluxes is led to the projection lens.

2. The optical system as claimed in claim 1, comprising a plurality of the optical deflecting arrays as a first optical deflecting array and a second optical deflecting array, each of which includes the optical deflecting device group which deflects light to two-axes, in four directions by individually operating two deflection axes so that the incoming light fluxes enter from two directions respectively corresponding to the two deflection axes, the incoming light fluxes in the two directions are reflected to the one direction by shifting time in each optical deflection operation of the optical deflecting devices based on the color information, and each of the reflected light fluxes is led to the projection lens,
    wherein the incoming light fluxes entering the first optical deflecting array and the second optical deflecting array have different colors.

3. The optical system as claimed in claim 1, comprising a plurality of the optical deflecting arrays as a first optical deflecting array and a second optical deflecting array,
    wherein:
    the first optical deflecting array includes an optical deflecting device group which deflects light to two-axes, in four directions by individually operating two deflection axes so that the incoming light fluxes enter from two directions respectively corresponding to the two deflection axes, the incoming light fluxes in the two directions are reflected to the one direction by shifting time in each optical deflection operation of the optical deflecting devices based on the color information, and each of the reflected light fluxes is led to the projection lens; and
    the second optical deflecting array includes an optical deflecting device group which deflects light to one-axis direction so that an incoming light flux enters from one direction, the incoming light flux in the one direction is reflected to the one direction by shifting time in each optical deflection operation of the optical deflecting devices based on the color information, and a reflected light flux is led to the projection lens,
    wherein the incoming light fluxes entering the first optical deflecting array and the second optical deflecting array have different colors.

4. The optical system as claimed in claim 2, wherein the reflected light fluxes, which are reflected based on the color information from the first optical deflecting array and the second optical deflecting array, are combined, and are led to the projection lens.

5. The optical system as claimed in claim 1, wherein the optical deflecting array includes the optical deflecting device group which deflects to the two-axes, in four directions by individually operating two deflection axes so that incoming light fluxes having different colors enter each of the optical deflecting devices from two directions respectively corresponding to the two deflection axes, and are reflected to the one direction by shifting time in each optical deflection operation of the optical deflecting devices based on the color information, and each of reflected light fluxes is led to the projection lens, wherein in the incoming light fluxes entering the optical deflecting devices from the two directions, at least one incoming light flux is switched to an incoming light flux of a different color at a shifted time, so that the incoming light fluxes entering the optical deflecting array have different colors.

6. The optical system as claimed in claim 1, wherein a direction of the reflected light fluxes is a direction perpendicular to a surface of the optical deflecting array.

7. A color information displaying method using an optical system, wherein:

the optical system comprises at least one optical deflecting array including an optical deflecting device group of a plurality of optical deflecting devices, each of the optical deflecting devices that deflects light to two-axes, in four directions by individually operating two deflection axes so that incoming light fluxes enter each of the optical deflecting devices from two directions respectively corresponding to the two deflection axes, are reflected to the one direction by shifting time in each optical deflection operation of the optical deflecting devices based on the color information, and each of reflected light fluxes is led to the projection lens, and wherein in the plurality of the optical deflecting devices, a first optical deflecting device and a second optical deflecting device being adjacent to each other lead the incoming light fluxes having different colors of different deflection axes, to the projection lens at a shifted time.

8. A color information displaying method using an optical system, wherein:

the optical system comprises at least one optical deflecting array including an optical deflecting device group of a plurality of optical deflecting devices, each of the optical deflecting devices that deflects light to two-axes, in four directions by individually operating two deflection axes so that incoming light fluxes enter each of the optical deflecting devices from two directions respectively corresponding to the two deflection axes, are reflected to the one direction by shifting time in each optical deflection operation of the optical deflecting devices based on the color information, and each of reflected light fluxes is led to the projection lens, and wherein a switch of an optical deflection between two axes is conducted multiple times in one frame display time.

9. An image projection displaying apparatus, comprising an optical system comprising:

an optical deflecting array including a plurality of optical deflecting devices arranged in a two-dimensional array, each of optical deflecting devices displacing a member having an optical reflection area and deflecting light, so that an incoming light flux entering the optical reflection area is deflected to a reflection direction being changed;

a light source illuminating the optical deflecting array; and a projection lens projecting reflected light from the optical deflecting array based on color information, wherein:

the plurality of the optical deflecting devices is formed as an optical deflecting device group, and each of the optical deflecting devices deflects light to two-axes, in four directions by individually operating two deflection axes;

incoming light fluxes having different colors enter each of the optical deflecting devices from two directions respectively corresponding to the two deflection axes, and are reflected to the one direction by shifting time in each optical deflection operation of the optical deflecting devices based on the color information; and each of reflected light fluxes is led to the projection lens, wherein in the plurality of the optical deflecting devices, a first optical deflecting device and a second optical deflecting device being adjacent to each other lead the incoming light fluxes having different colors of different deflection axes, to the projection lens at a shifted time, and whereby an image is projected and displayed.

* * * * *